United States Patent
Sun et al.

(10) Patent No.: US 11,677,646 B2
(45) Date of Patent: Jun. 13, 2023

(54) COMMUNICATION POLICY CONTROL METHOD, APPARATUS, AND SYSTEM

(71) Applicant: Huawei Technologies Co., Ltd., Shenzhen (CN)

(72) Inventors: Haiyang Sun, Beijing (CN); Yizhuang Wu, Beijing (CN); Wanqiang Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/404,232

(22) Filed: Aug. 17, 2021

(65) Prior Publication Data

US 2021/0377138 A1 Dec. 2, 2021

Related U.S. Application Data

(63) Continuation of application No. PCT/CN2020/072307, filed on Jan. 15, 2020.

(30) Foreign Application Priority Data

Feb. 18, 2019 (CN) .......................... 201910120721.9

(51) Int. Cl.
*H04L 43/06* (2022.01)
*H04L 43/08* (2022.01)

(52) U.S. Cl.
CPC .............. *H04L 43/06* (2013.01); *H04L 43/08* (2013.01)

(58) Field of Classification Search
CPC ................................. H04L 43/06; H04L 43/08
(Continued)

(56) References Cited

U.S. PATENT DOCUMENTS 10,165,476 B1 * 12/2018 Yan .................... H04W 36/0033
2013/0223290 A1 * 8/2013 Zhou ...................... H04M 15/66
370/259
(Continued)

FOREIGN PATENT DOCUMENTS

CN 1805590 A 7/2006
CN 102143530 A 8/2011
(Continued)

OTHER PUBLICATIONS

TS23.502, "5G; Procedures for the 5G system (3GPP TS 23.502 version 15.3.0 Release 15)", ETSI technical specification, Sep. 2018 (Year: 2018).*
(Continued)

*Primary Examiner* — Nicholas R Taylor
*Assistant Examiner* — Chong G Kim
(74) *Attorney, Agent, or Firm* — Slater Matsil, LLP

(57) ABSTRACT

A communication method, apparatus, and system, the method including sending, by a policy control network element, policy control information to a network device, where the policy control information includes a trigger event for reporting transport network information, and where the trigger event triggers the network device to report the transport network information to the policy control network element, receiving, by the policy control network element, the transport network information from the network device, formulating, by the policy control network element, a control policy based on the transport network information, and sending, by the policy control network element, the control policy to the network device.

32 Claims, 15 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2019/0053308 A1 | 2/2019 | Castellanos Zamora et al. | |
| 2019/0116518 A1* | 4/2019 | Stojanovski | H04W 28/0257 |
| 2019/0116521 A1* | 4/2019 | Qiao | H04W 28/06 |
| 2019/0124572 A1* | 4/2019 | Park | H04W 36/08 |
| 2020/0288379 A1* | 9/2020 | Tang | H04W 48/12 |
| 2021/0185598 A1* | 6/2021 | Kim | H04W 72/12 |
| 2022/0022089 A1* | 1/2022 | Zhu | H04W 28/0268 |

FOREIGN PATENT DOCUMENTS

| | | |
|---|---|---|
| CN | 108632882 A | 10/2018 |
| WO | 2018126692 A1 | 7/2018 |
| WO | 2018174846 A1 | 9/2018 |
| WO | 2019007525 A1 | 1/2019 |

OTHER PUBLICATIONS

TS23.503, "5G; Policy and Charging Control Framework for the 5G System (3GPP TS 23.503 version 15.3.0 Release 15)", ETSI technical specification, Sep. 2018 (Year: 2018).*

Chen, Z.C., "PCRF Strategy Management Mechanism and its Optimization", China Telecom Co., Ltd., Fujian Branc, Mar. 15, 2015, 4 pages (English Abstract Only).

"3rd Generation Partnership Project; Technical Specification Group Services and System Aspects; System Architecture for the 5G System; Stage 2 (Release 15)," 3GPP TS 23.501 V15.4.0, Dec. 2018, 236 pages.

"3rd Generation Partnership Project; Technical Specification Group Services and System Aspects; Policy and Charging Control Framework for the 5G System; Stage (Release 15)," 3GPP TS 23.503 V15.4.0, Dec. 2018, 76 pages.

"Policy Update When UE Suspends," Source to WG: Huawei, Source to TSG: C3, Work item code: 5GS_Ph1-CT, Date: Oct. 8, 2018, Category: F, Release: Rel-15, 3GPP TSG-CT WG3 Meeting #98Bis, C3-186043, Change Request, Vilnius, Lithuania, Oct. 15-19, 2018, 30 pages.

"TS 23.502 OI#16 MSISDN Support," Source: Huawei, HiSilicon, China Mobile, SK Telecom, China Telecom, Document for: Approval, Agenda Item: 6.5.1, Work Item / Release: 5GS_Ph1 / Rel-15, SA WG2 Meeting #123, S2-177833, (revision of S2-177138), 23-27, Oct. 2017, Ljubljana, Slovenia, 25 pages.

"5G; 5G System; Session Management Policy Control Service; Stage 3 (3GPP TS 29.512 version 15.1.0 Release 15)," ETSI TS 129 512 V15.1.0, Oct. 2018, 117 pages.

"3rd Generation Partnership Project; Technical Specification Group Services and System Aspects; Policy and charging control architecture (Release 15)," 3GPP TS 23.203 V15.4 0, Sep. 2018, 262 pages.

"3rd Generation Partnership Project; Technical Specification Group Services and System Aspects; Procedures for the 5G System; Stage 2 (Release 15)," 3GPP TS 23.502 V15.4.1, Jan. 2019, 347 pages.

"3rd Generation Partnership Project; Technical Specification Group Services and System Aspects; Telecommunication management; Charging management; 5G system, charging service; Stage 3 (Release 15)," 3GPP TS 32.291 V15.1.0, Dec. 2018, 73 pages.

* cited by examiner

COMMUNICATION POLICY CONTROL METHOD, APPARATUS, AND SYSTEM

CROSS-REFERENCE TO RELATED APPLICATIONS

This application is a continuation of International Patent Application No. PCT/CN2020/072307, filed on Jan. 15, 2020, which claims priority to Chinese Patent Application No. 201910120721.9, filed on Feb. 18, 2019. The disclosures of the aforementioned applications are hereby incorporated by reference in their entireties.

TECHNICAL FIELD

This application relates to the field of communication technologies, and in particular, to a communication method, apparatus, and system.

BACKGROUND

Currently, in a wireless communication system, for example, in a 5th generation (5G) communication system shown in FIG. 1, a policy control function (PCF) network element usually formulates control policies such as a terminal policy, an access and mobility management policy, or a session management (SM) policy based on information such as an access network type and user subscription data provided by a session management (SM) function (SMF) network element, an access and mobility management function (AMF) network element, and a unified data management (UDM) network element.

However, the information such as the access network type and the user subscription data is only partial information of the wireless communication system, and cannot reflect an overall running status of the wireless communication system. Consequently, a mismatch between an actually used control policy and an actual communication environment may be caused during end-to-end data transmission, thereby affecting communication efficiency and reliability of the wireless communication system.

SUMMARY

Embodiments of this application provide a communication method, apparatus, and system, so that a control policy can be adaptively adjusted based on transport network (back-haul) information, thereby improving efficiency and reliability of a wireless communication system.

To achieve the foregoing objective, the following technical solutions are used in the embodiments of this application.

According to a first aspect, a communication method and a corresponding communication apparatus are provided. In this solution, a policy control network element receives transport network information from a network device, and formulates a control policy based on the transport network information. Then, the policy control network element sends the control policy to the network device. Based on this solution, the policy control network element may receive the transport network information reported by the network device, formulate, based on the transport network information, the control policy corresponding to a current transport network, and send the control policy to the network device. Therefore, the network device may correspondingly adjust, based on the control policy, a used service mode during end-to-end data transmission, thereby avoiding a mismatch between the service mode and the current transport network, and improving efficiency and reliability of a wireless communication system.

For example, the transport network information includes a type and/or a capability of a transport network.

In a possible design, the solution may further include: The policy control network element sends policy control information to the network device. The policy control information includes a trigger event for reporting the transport network information, and the trigger event is used to trigger the network device to report the transport network information to the policy control network element.

In another possible design, the solution may further include: The policy control network element sends subscription notification information to the network device. The subscription notification information includes a subscription event of reporting the transport network information, and the subscription event is used to subscribe to the transport network information reported by the network device to the policy control network element.

In a possible design, the network device may be a session management (SM) function network element. Correspondingly, the control policy may include a session management (SM) policy. The session management (SM) policy may include at least one of the following: adjusting a transmission delay parameter to a value greater than or equal to a transport network delay, setting a charging type to no charging, and allowing transmission of a part of services.

In another possible design, the network device may alternatively be an access and mobility management network element. Correspondingly, the control policy may include at least one of the following: a terminal policy or an access and mobility management policy.

For example, the terminal policy includes at least one of the following: only allowing a terminal to initiate a session to a specified data network or a single network slice selection assistance information network element, or forbidding a terminal to transmit data in a radio access manner.

For example, the access and mobility management policy may include: forbidding a terminal in a restricted area to actively initiate a service.

According to a second aspect, a communication method and a corresponding communication apparatus are provided. In this solution, a network device sends transport network information to a policy control network element, and receives a control policy from the policy control network element. The transport network information is used by the policy control network element to formulate the control policy.

For example, the transport network information includes a type and/or a capability of a transport network.

In a possible design, the solution may further include: The network device receives policy control information from the policy control network element. The policy control information includes a trigger event for reporting the transport network information, and the trigger event is used to trigger the network device to report the transport network information to the policy control network element.

In a possible design, the solution may further include: The network device receives subscription notification information from the policy control network element. The subscription notification information includes a subscription event of reporting the transport network information, and the subscription event is used to subscribe to the transport network information reported by the network device to the policy control network element.

In one aspect, the network device may be a session management (SM) function network element. Correspondingly, the control policy may include a session management (SM) policy. The session management (SM) policy includes at least one of the following: adjusting a transmission delay parameter to a value greater than or equal to a transport network delay, setting a charging type to no charging, and allowing transmission of a part of services.

Specifically, when the network device is the session management (SM) function network element, the network device may obtain the transport network information in any one of the following manners.

Optionally, the network device receives a user plane function network element identifier from a user plane function network element, and determines the transport network information based on the user plane function network element identifier.

Optionally, the network device receives the transport network information from a user plane function network element.

Optionally, the network device receives the transport network information from an access and mobility management network element.

Optionally, the network device receives a radio access network identifier from an access and mobility management network element or a user plane function network element, and determines the transport network information based on the radio access network identifier.

Optionally, the network device monitors quality of service (QoS), and determines, based on monitored QoS information, the transport network information independently or requests another network element to determine the transport network information based on monitored QoS information. The QoS information may include delay information of the transport network.

Optionally, the network device may independently determine the transport network information based on the monitored QoS information.

Alternatively, optionally, the network device may send the monitored QoS information to a network data analytics function network element, and receive the transport network information from the network data analytics function network element.

In another aspect, the network device may alternatively be an access and mobility management network element. Correspondingly, the control policy may include at least one of the following: a terminal policy or an access and mobility management policy.

For example, the terminal policy includes at least one of the following: only allowing a terminal to initiate a session to a specified data network or a single network slice selection assistance information network element, or forbidding a terminal to transmit data in a radio access manner.

For example, the access and mobility management policy may include: forbidding a terminal in a restricted area to actively initiate a service.

Specifically, when the network device is the access and mobility management network element, the network device may obtain the transport network information in any one of the following manners.

Optionally, the network device receives the transport network information from a session management (SM) function network element.

Optionally, the network device receives a radio access network identifier from a radio access network, and determines the transport network information based on the radio access network identifier.

In a possible design, the solution may further include: The network device forwards the control policy to the radio access network, so that the radio access network configures and implements the control policy.

According to a third aspect, a communication apparatus is provided, configured to implement the foregoing communication methods. The communication apparatus may be the policy control network element in the first aspect or the second aspect, or an apparatus including the policy control network element. Alternatively, the communication apparatus may be the network device in the first aspect or the second aspect, or an apparatus including the network device. The communication apparatus includes a corresponding module, unit, or means (means) for implementing the foregoing communication method. The module, unit, or means may be implemented by hardware, software, hardware executing corresponding software. The hardware or the software includes one or more modules or units corresponding to the foregoing functions.

According to a fourth aspect, a communication apparatus is provided, and includes a processor and a memory. The memory is configured to store computer instructions, and when the processor executes the instructions, the communication apparatus is enabled to perform the communication method according to any one of the foregoing aspects. The communication apparatus may be the policy control network element in the first aspect or the second aspect, or an apparatus including the policy control network element. Alternatively, the communication apparatus may be the network device in the first aspect or the second aspect, or an apparatus including the network device.

According to a fifth aspect, a communication apparatus is provided, and includes a processor. The processor is configured to: be coupled to a memory, and after reading instructions in the memory, perform, based on the instructions, the communication method according to any one of the foregoing aspects. The communication apparatus may be the policy control network element in the first aspect or an apparatus including the policy control network element. Alternatively, the communication apparatus may be the network device in the second aspect or an apparatus including the network device.

According to a sixth aspect, a computer-readable storage medium is provided. The computer-readable storage medium stores instructions. When the instructions are run on a computer, the computer is enabled to perform the communication method according to any one of the foregoing aspects.

According to a seventh aspect, a computer program product is provided, and includes instructions. When the instructions are run on a computer, the computer is enabled to perform the method according to any one of the foregoing aspects.

According to an eighth aspect, a communication apparatus (for example, the communication apparatus may be a chip or a chip system) is provided. The communication apparatus includes a processor, configured to implement the functions according to any one of the foregoing aspects.

In a possible design, the communication apparatus further includes a memory. The memory is configured to store necessary program instructions and necessary data. When the communication apparatus is a chip system, the communication apparatus may include a chip, or may include a chip and another discrete component.

For technical effects brought by any one of the designs of the second aspect to the eighth aspect, refer to technical effects brought by the different designs of the first aspect. Details are not described herein again.

According to a ninth aspect, a communication system is provided. The communication system includes a policy control network element and a network device. The policy control network element is configured to: receive transport network information from the network device, and send, to the network device, a control policy determined based on the transport network information. The network device is configured to: send, to the policy control network element, the transport network information used to formulate the control policy, and receive the control policy from the policy control network element.

In a possible design, the policy control network element is further configured to perform the communication method according to any one of the possible designs of the first aspect or the second aspect.

In a possible design, the network device is further configured to perform the communication method according to any one of the possible designs of the first aspect or the second aspect.

For technical effects brought by any one of the designs of the ninth aspect, refer to technical effects brought by the different designs of the first aspect and the second aspect. Details are not described herein again.

DETAILED DESCRIPTION OF ILLUSTRATIVE EMBODIMENTS

The following describes the technical solutions in embodiments of this application with reference to the accompanying drawings in the embodiments of this application. In the descriptions of this application, "/" represents an "or" relationship between associated objects unless otherwise specified. For example, A/B may represent A or B. The term "and/or" in this application indicates only an association relationship for describing associated objects and indicates that three relationships may exist. For example, A and/or B may indicate the following three cases: Only A exists, both A and B exist, and only B exists, where A and B may be singular or plural. In addition, in the description of this application, "a plurality of" means two or more unless otherwise specified. "At least one of the following items (pieces)" or a similar expression thereof means any combination of the items, including any combination of one item (piece) or a plurality of items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items whose functions and purposes are basically the same. A person skilled in the art may understand that the terms such as "first" and "second" do not limit a quantity and an execution sequence, and the terms such as "first" and "second" do not indicate a definite difference.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 2:
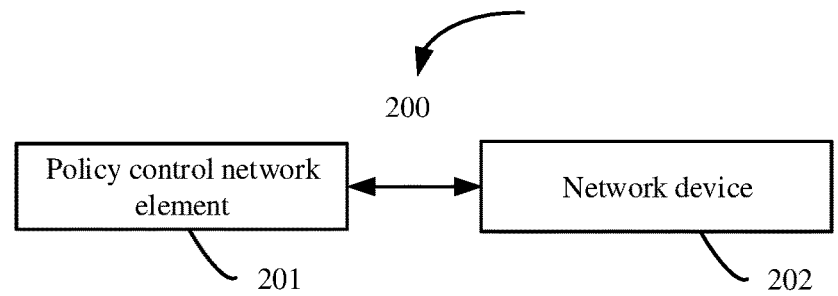
FIG. 2 is a schematic architectural diagram of a communication system according to an embodiment of this application.

FIG. 2 is a schematic architectural diagram of a communication system 200 according to an embodiment of this application. As shown in FIG. 2, the communication system 200 includes a policy control network element 201 and a network device 202. The policy control network element 201 receives transport network information from the network device 202, then formulates a corresponding control policy based on the transport network information, and sends the control policy to the network device 202. A specific implementation of the solution is described in detail in a subsequent method embodiment. Details are not described herein. Based on this solution, the policy control network element 201 may receive the transport network information reported by the network device 202, formulate, based on the transport network information, the control policy corresponding to a current transport network, and send the control policy to the network device 202. Therefore, the network device 202 may correspondingly adjust, based on the control policy, a used service mode during end-to-end data transmission, thereby avoiding a mismatch between the service mode and the current transport network, and improving efficiency and reliability of a wireless communication system.

For example, in an area where natural disasters such as an earthquake and a tsunami occur, an optical fiber transport network used as an active transport network may be paralyzed and cannot provide a data transmission service, and a satellite transport network used as a standby transport network needs to be enabled. Because a transmission delay of the satellite transport network is usually higher than that of the optical fiber transport network, and a transmission bandwidth, a system capacity, and the like of the satellite transport network may be lower than that of the optical fiber transport network, it is necessary to adjust a control policy, for example, adjust a data transmission delay parameter such as a PBD, prohibit a terminal device in the area from initiating a call, or restrict a range in which the terminal device can initiate a service, to ensure smooth basic communication and improve reliability of a wireless communication system.

For example, after an active transport network, for example, an optical fiber transport network, in an area in which the foregoing natural disaster occurs is recovered, it is also necessary to re-enable the optical fiber transport network, and correspondingly adjust a control policy, for example, adjust a data transmission delay parameter to a relatively small value, increase a transmission bandwidth and a system capacity, or remove the foregoing restrictions on the terminal device in the area, to improve communication efficiency of the wireless communication system.

Optionally, the transport network information may include a type and/or a capability of a transport network.

For example, the type of the transport network may be an optical fiber transport network, a satellite transport network, or a transport network of another type. The satellite transport network may include one or more of a synchronous satellite transport network, a low earth orbit satellite transport network, a medium earth orbit satellite transport network, or a high earth orbit satellite transport network.

For example, the capability of the transport network may include a transmission delay, a transmission bandwidth, a data rate, a bit error rate, a system capacity, or the like.

It is easy to understand that the network device may independently report the transport network information to the policy control network element based on a preset reporting instruction, or may report the transport network information to the policy control network element based on policy control information from the policy control network element.

Specifically, the preset reporting instruction may be preconfigured in a local executable script of the network device before delivery of the network device or before network running, or may be configured in a control program of an SMF network element in an embedded manner, or may be configured in a configuration file that can be invoked by the control program of the network device.

Optionally, the transport network information and the preset reporting instruction may be locally configured in the network device. After the network device is powered on, the configured transport network information is periodically or aperiodically reported to the policy control network element based on the preset reporting instruction.

Optionally, the network device may learn of the transport network information from another network device or network element, and report the transport network information after the network device learns of the transport network information based on the preset reporting instruction.

Specifically, the policy control network element may deliver the policy control information to the network device by using signaling. Correspondingly, the network device reports the transport network information to the policy control network element based on the policy control information. Therefore, in a possible design, the policy control network element sends the policy control information to the network device. Correspondingly, the network device receives the policy control information from the policy control network element, and reports the transport network information based on the policy control information. The policy control information includes a trigger event for reporting the transport network information, and the trigger event is used to trigger the network device to report the transport network information to the policy control network element.

In another possible design, the policy control network element sends subscription notification information to the network device. Correspondingly, the network device receives the subscription notification information from the policy control network element, and reports the transport network information based on the subscription notification information. The subscription notification information includes a subscription event of reporting the transport network information, and the subscription event is used to subscribe to the transport network information reported by the network device to the policy control network element.

In a possible design, the network device may be a session management (SM) function network element. Correspondingly, the control policy may include a session management (SM) policy. The session management (SM) policy may include at least one of the following: adjusting a transmission delay parameter to a value greater than or equal to a transport network delay, setting a charging type to no charging, and allowing transmission of only a part of services.

In another possible design, the network device may alternatively be an access and mobility management network element. Correspondingly, the control policy may include at least one of the following: a terminal policy or an access and mobility management policy.

For example, the terminal policy includes at least one of the following: only allowing a terminal to initiate a session to a specified data network or a single network slice selection assistance information network element, or forbidding a terminal to transmit data in a radio access manner.

For example, the access and mobility management policy may include: forbidding a terminal in a restricted area to actively initiate a service.

Figure 3:
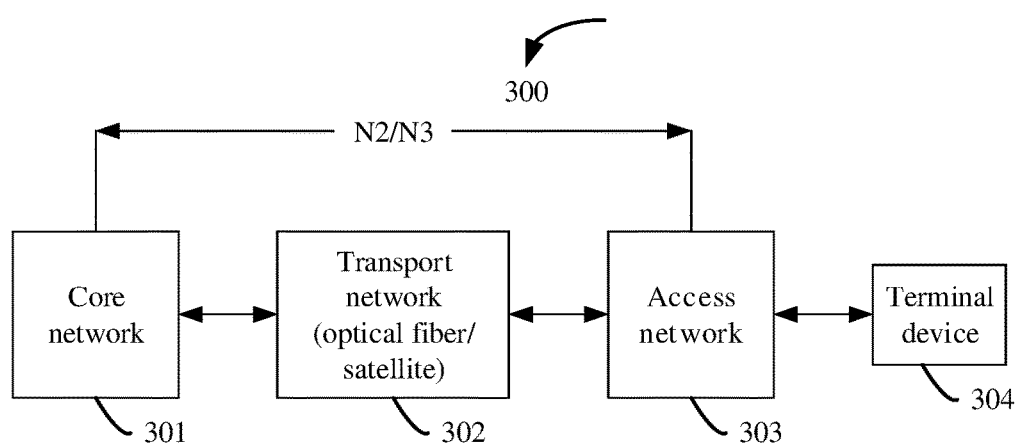
FIG. 3 is a schematic architectural diagram of another communication system according to an embodiment of this application.

FIG. 3 is a schematic architectural diagram of another communication system according to an embodiment of this application. As shown in FIG. 3, the communication system 300 includes a core network 301, a transport network 302, an access network 303, and a terminal device 304. The core network 301 may include the communication system 200 shown in FIG. 2.

Optionally, the communication system 300 shown in FIG. 3 may be applied to a 5G system that is currently under discussion, or another future communication system. This is not specifically limited in this embodiment of this application.

Figure 4A:
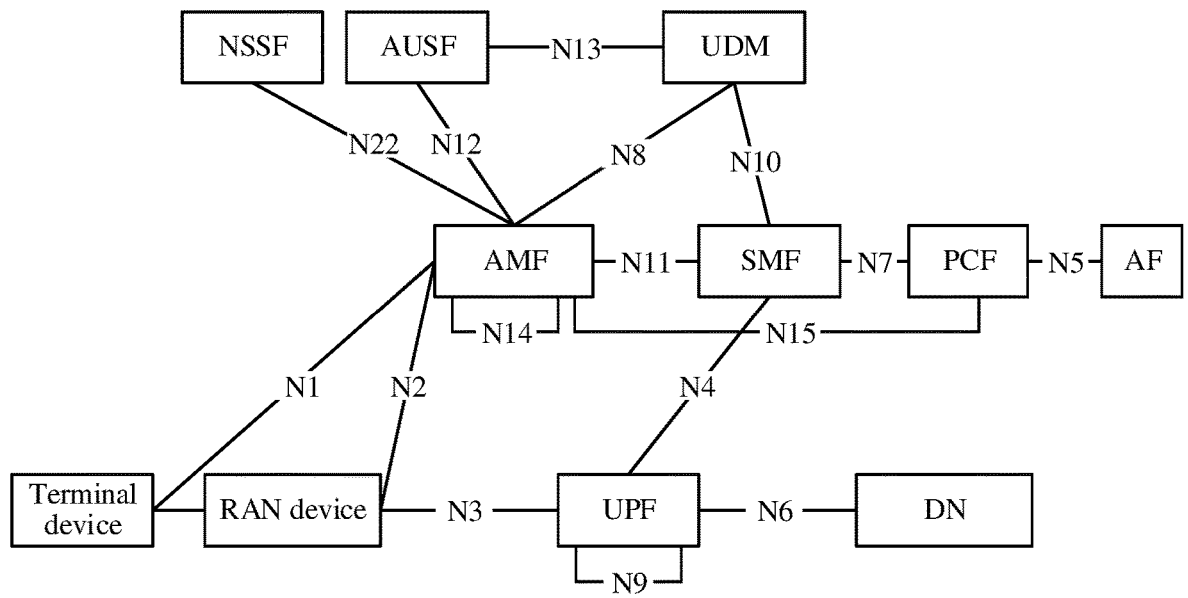
FIG. 4A shows a 5G network architecture 1 in a non-roaming scenario according to an embodiment of this application.
Figure 4B:
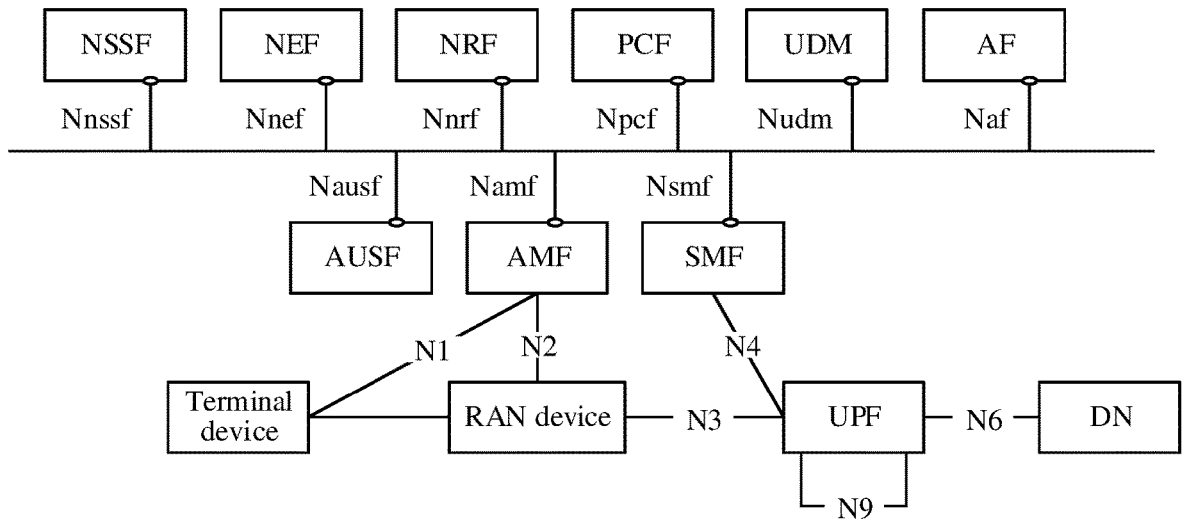
FIG. 4B shows a 5G network architecture 2 in a non-roaming scenario according to an embodiment of this application.

For example, assuming that the communication system 300 shown in FIG. 3 is applied to a 5G network architecture in a non-roaming scenario, as shown in FIG. 4A or FIG. 4B, a network element or an entity corresponding to the policy control network element 201 may be a PCF network element in the non-roaming 5G network architecture, and a network element or an entity corresponding to the network device 202 may be an SMF network element or an AMF network element in the non-roaming 5G network architecture. The access network 303 may include a radio access network (RAN) device in FIG. 4A, and the terminal device 304 may be a terminal device in FIG. 4A.

In addition, as shown in FIG. 4A, the non-roaming 5G network architecture may further include a user plane function (UPF) network element, a network slice selection function (NSSF) network element, an authentication server function (AUSF) network element, a unified data management (UDM) network element, an application function (AF) network element, and the like. This is not specifically limited in this embodiment of this application.

The terminal device communicates with the AMF network element through a next generation (N) 1 interface (N1). The RAN device communicates with the AMF network element through an N2 interface (N2), and the RAN device communicates with the UPF network element through an N3 interface (N3). The UPF network element communicates with a data network (DN) through an N6 interface (N6). The AMF network element communicates with the SMF network element through an N11 interface (N11), the AMF network element communicates with the PCF network element through an N15 interface (N15), the AMF network element communicates with the NSSF network element through an N22 interface, the AMF network element communicates with the AUSF network element through an N12 interface (N12), and the AMF network element communicates with the UDM network element through an N8 interface (N8). The SMF network element communicates with the PCF network element through an N7 interface (N7), the SMF network element communicates with the UPF network element through an N4 interface (N4), and the SMF network element communicates with the UDM network element through an N10 interface (N10). The PCF network element communicates with the AF network element through an N5 interface. The UDM network element communicates with the AUSF network element through an N13 interface (N13).

In addition, it should be noted that control plane network elements such as the AMF network element, the SMF network element, the PCF network element, the NSSF network element, the AUSF network element, and the UDM network element in the non-roaming 5G network architecture shown in FIG. 4A may alternatively interact with each other through a service-based interface. For example, as shown in FIG. 4B, a service-based interface exhibited by the AMF network element may be Namf, a service-based interface exhibited by the SMF network element may be Nsmf, a service-based interface exhibited by the PCF network element may be Npcf, a service-based interface exhibited by the NSSF network element may be Nnssf, a service-based interface exhibited by the AUSF network element may be Nausf, and a service-based interface exhibited by the UDM network element may be Nudm. For related descriptions, refer to a 5G system architecture in the standard 23.501. Details are not described herein.

Figure 4C:
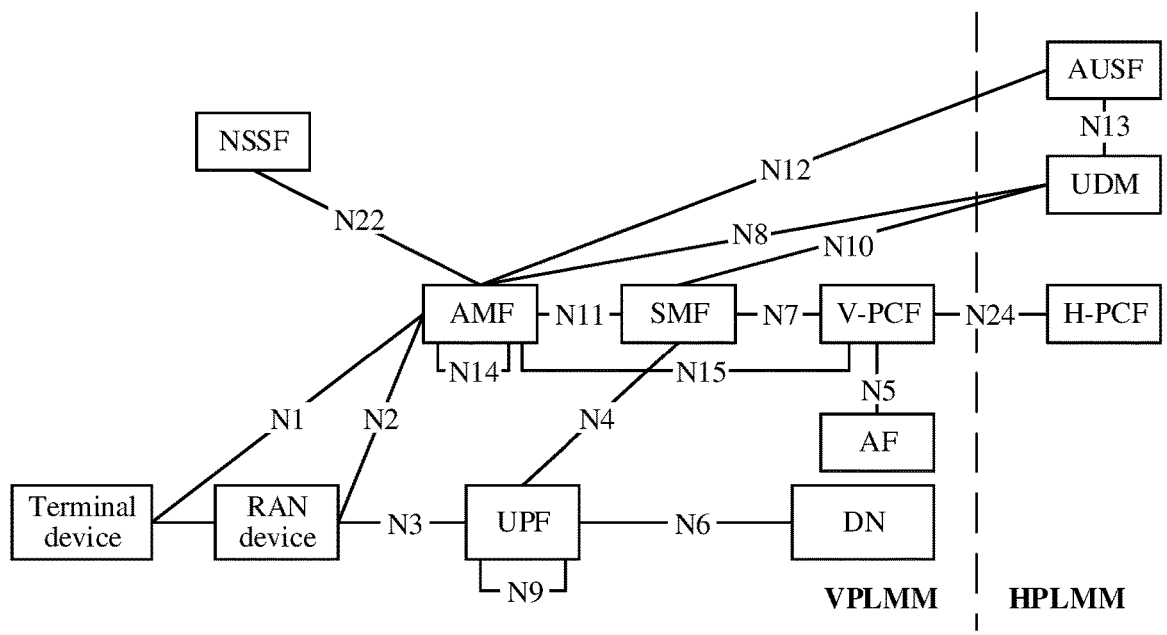
FIG. 4C shows a 5G network architecture 1 in a roaming scenario according to an embodiment of this application.

Alternatively, for example, assuming that the communication system 300 shown in FIG. 3 is applied to a 5G network architecture in a local breakout (local breakout) roaming scenario, as shown in FIG. 4C, a network element or an entity corresponding to the policy control network element 201 may be a visited PCF (V-PCF) network element in the local breakout roaming 5G network architecture, and a network element or an entity corresponding to the network device 202 may be an AMF network element or an SMF network element in the local breakout roaming 5G network architecture. The access network 303 may include a RAN device in FIG. 4C, and the terminal device 304 may be a terminal device in FIG. 4C.

In addition, as shown in FIG. 4C, the local breakout roaming 5G network architecture may further include a UPF network element, a home PCF (H-PCF) network element, an NSSF network element, an AUSF network element, a UDM network element, and the like. This is not specifically limited in this embodiment of this application. The UDM network element, the AUSF network element, and the H-PCF network element are in a home public land mobile network (HPLMN). The RAN device, the AMF network element, the SMF network element, the UPF network element, the V-PCF network element, the NSSF network element, and the AF network element are in a visited public land mobile network (VPLMN).

The terminal device communicates with the AMF network element through an N1 interface (N1). The RAN device communicates with the AMF network element through an N2 interface (N2), and the RAN device communicates with the UPF network element through an N3 interface (N3). The UPF network element communicates with a DN through an N6 interface (N6). The AMF network element communicates with the SMF network element through an N11 interface (N11), the AMF network element communicates with the V-PCF network element through an N15 interface (N15), the AMF network element communicates with the NSSF network element through an N22 interface (N22), the AMF network element communicates with the AUSF network element through an N12 interface (N12), and the AMF network element communicates with the UDM network element through an N8 interface (N8). The SMF network element communicates with the V-PCF network element through an N7 interface (N7), the SMF network element communicates with the UPF network element through an N4 interface (N4), and the SMF network element communicates with the UDM network element through an N10 interface (N10). The V-PCF network element communicates with the AF network element through an N5 interface (N5), and the V-PCF network element communicates with the H-PCF network element through an N24 interface (N24). The UDM network element communicates with the AUSF network element through an N13 interface (N13).

Figure 4D:
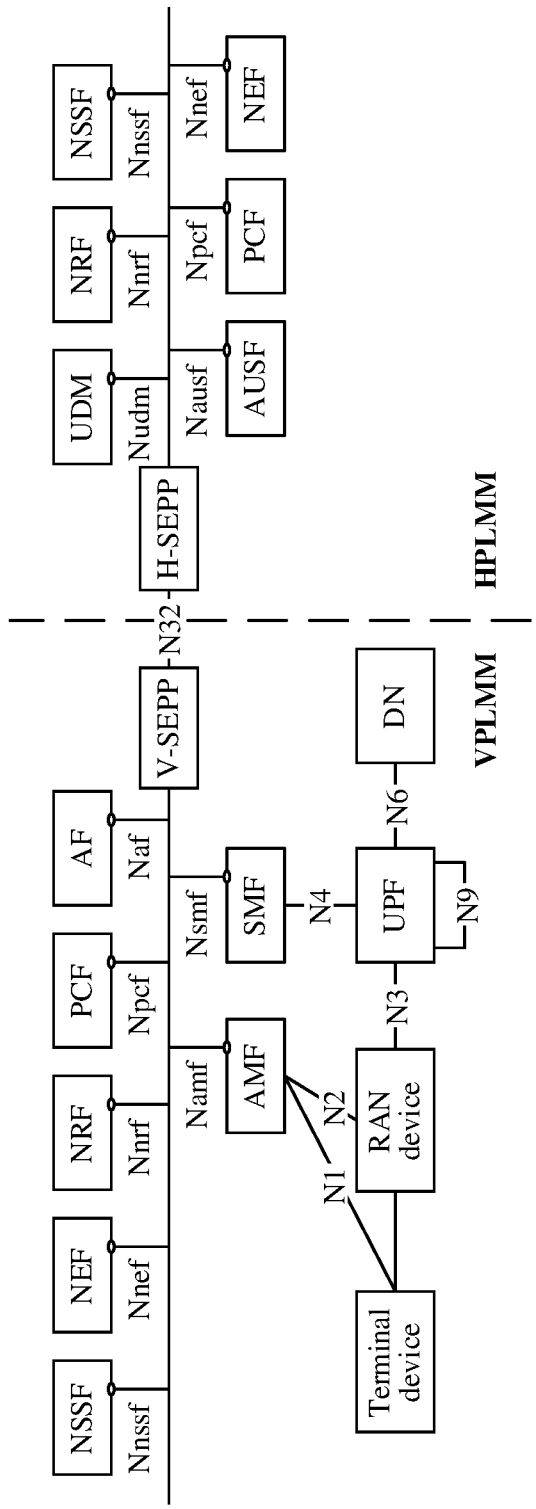
FIG. 4D shows a 5G network architecture 2 in a roaming scenario according to an embodiment of this application.

In addition, it should be noted that control plane network elements such as the AMF network element, the SMF network element, the UDM network element, the AUSF network element, the NSSF network element, the V-PCF network element, and the H-PCF network element in the local breakout roaming 5G network architecture shown in FIG. 4C may alternatively interact with each other through a service-based interface. For example, as shown in FIG. 4D, a service-based interface exhibited by the AMF network element may be Namf, a service-based interface exhibited by the SMF network element may be Nsmf, a service-based interface exhibited by the UDM network element may be Nudm, a service-based interface exhibited by the V-PCF network element may be Npcf, a service-based interface exhibited by the H-PCF network element may be Npcf, a service-based interface exhibited by the AUSF network element may be Nausf, and a service-based interface exhibited by the NSSF network element may be Nnssf. In addition, a visited security edge protection proxy (V-SEPP) in FIG. 4D is configured to perform information filtering, policy control, topology hiding, and the like on a control plane interface in the VPLMN. A home security edge protection proxy (H-SEPP) in FIG. 4D is configured to perform information filtering, policy control, topology hiding, and the like on a control plane interface in the HPLMN. The V-SEPP is connected to the H-SEPP through an N32 interface (N32). For all related descriptions, refer to a 5G system architecture (5G system architecture) in the standard 23.501. Details are not described herein.

Figure 4E:
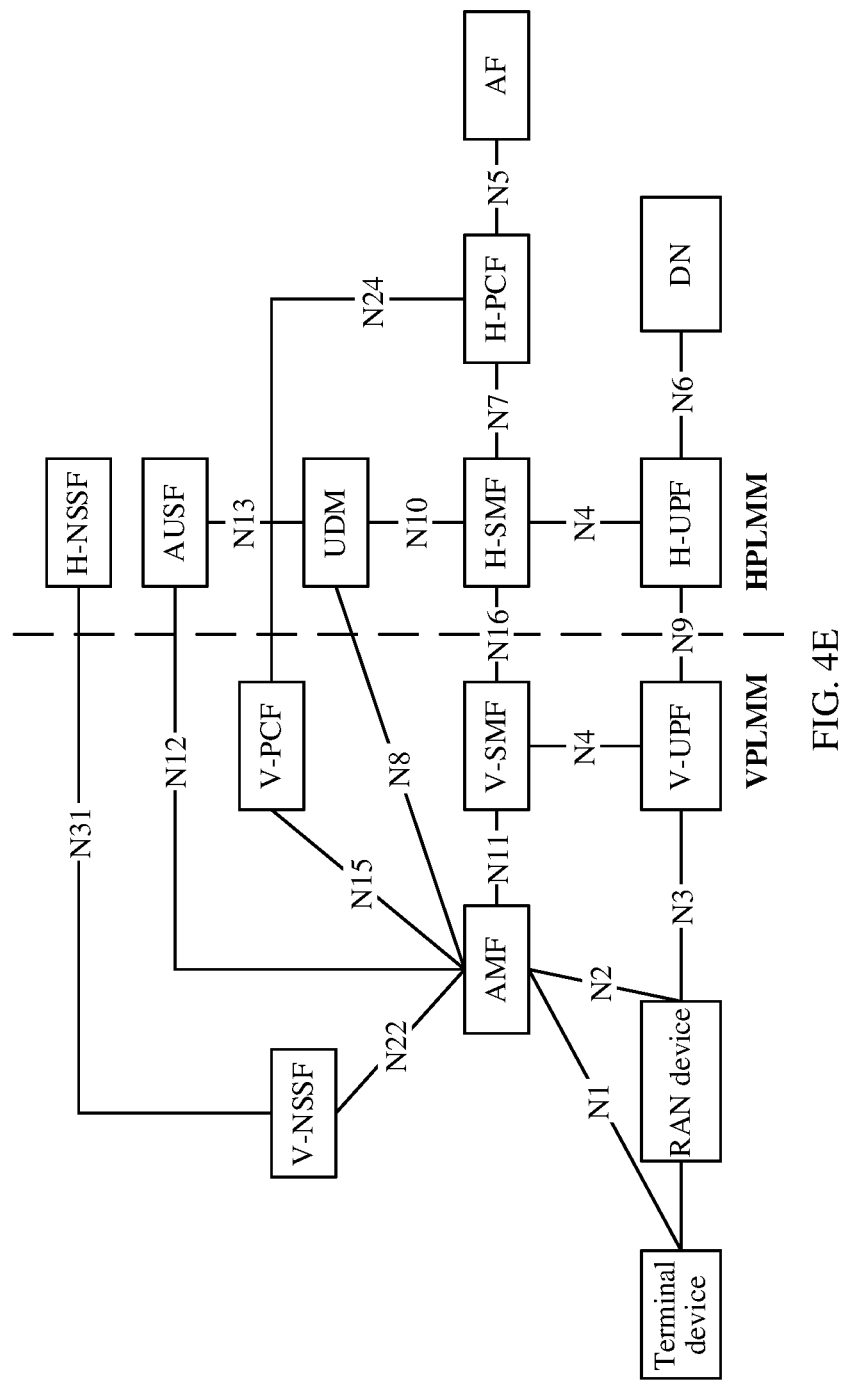
FIG. 4E shows a 5G network architecture 3 in a roaming scenario according to an embodiment of this application.

Alternatively, for example, assuming that the communication system 300 shown in FIG. 3 is applied to a 5G network architecture in a home routed (home routed) roaming scenario, as shown in FIG. 4E, a network element or an entity corresponding to the policy control network element 201 may be an H-PCF network element in the home routed 5G network architecture, and a network element or an entity corresponding to the network device 202 may be an AMF network element, a visited SMF (V-SMF) network element, or a home SMF (H-SMF) network element in the home routed 5G network architecture. The access network 303 may include a RAN device in FIG. 4E, and the terminal device 304 may be a terminal device in FIG. 4E.

In addition, as shown in FIG. 4E, the home routed roaming 5G network architecture may further include a visited UPF (V-UPF) network element, a home UPF (H-UPF) network element, a visited PCF (V-PCF) network element, a visited NSSF (V-NSSF) network element, a home NSSF (H-NSSF) network element, an AUSF network element, a UDM network element, an AF network element, and the like. This is not specifically limited in this embodiment of this application. The H-NSSF network element, the AUSF network element, the UDM network element, the H-SMF network element, the H-PCF network element, the H-UPF network element, the AF network element, and the H-UPF network element are in the HPLMN. The RAN device, the V-UPF network element, the AMF network element, the V-SMF network element, the V-NSSF network element, and the V-PCF network element are in the VPLMN.

The terminal device communicates with the AMF network element through an N1 interface (N1). The RAN device communicates with the AMF network element through an N2 interface (N2), and the RAN device communicates with the UPF network element through an N3 interface (N3). The UPF network element communicates with a DN through an N6 interface (N6). The AMF network element communicates with the V-SMF network element through an N11 interface (N11), the V-SMF network element communicates with the H-SMF network element through an N1b interface (N16), the AMF network element communicates with the UDM network element through an N8 interface (N8), the AMF network element communicates with the AUSF network element through an N12 interface (N12), and the AMF network element communicates with the V-PCF network element through an N15 interface (N15). The V-PCF network element communicates with the H-PCF network element through an N24 interface (N24). The V-SMF network element communicates with the V-UPF network element through an N4 interface (N4). The H-SMF network element communicates with the H-UPF network element through an N4 interface (N4), the H-SMF network element communicates with the V-UPF network element through an N9 interface (N9), the H-SMF network element communicates with the UDM network element through an N10 interface (N10), and the H-SMF network element communicates with the UDM network element through an N7 interface (N7). The UDM network element communicates with the AUSF network element through an N13 interface (N13).

Figure 4F:
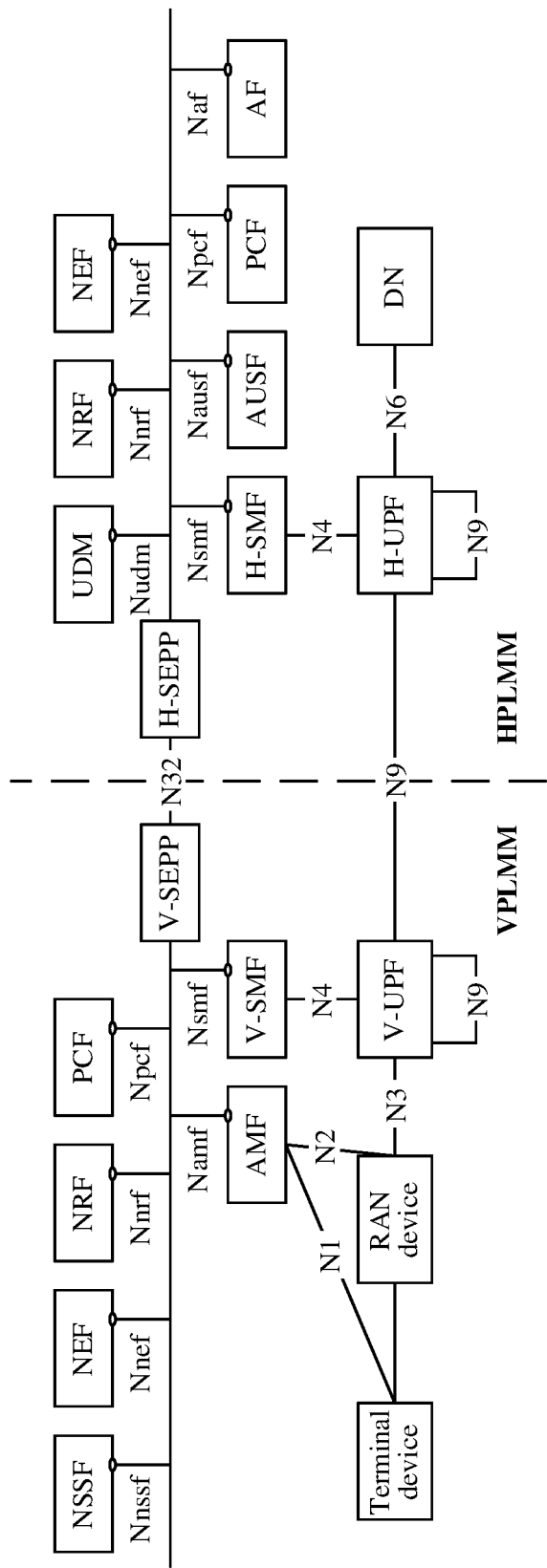
FIG. 4F shows a 5G network architecture 4 in a roaming scenario according to an embodiment of this application.

In addition, it should be noted that control plane network elements such as the AMF network element, the V-SMF network element, the H-SMF network element, the V-PCF network element, the H-PCF network element, the V-NSSF network element, the H-NSSF network element, the UDM network element, and the AUSF network element in the home routed roaming 5G network architecture shown in FIG. 4E may alternatively interact with each other through a service-based interface. For example, as shown in FIG. 4F, a service-based interface exhibited by the AMF network element may be Namf, a service-based interface exhibited by the V-SMF network element may be Nsmf, a service-based interface exhibited by the H-SMF network element may be Nsmf, a service-based interface exhibited by the V-PCF network element may be Npcf, a service-based interface exhibited by the H-PCF network element may be Npcf, a service-based interface exhibited by the UDM network element may be Nudm, and a service-based interface exhibited by the AUSF network element may be Nausf. In addition, a V-SEPP in FIG. 4F is configured to perform information filtering, policy control, topology hiding, and the like on a control plane interface in the VPLMN. An H-SEPP in FIG. 4F is configured to perform information filtering, policy control, topology hiding, and the like on a control plane interface in the HPLMN. The V-SEPP is connected to the H-SEPP through an N32 interface (N32). For all related descriptions, refer to a 5G system architecture in the standard 23.501. Details are not described herein.

Optionally, the policy control network element in this embodiment of this application may be a device configured to formulate the control policy, or may be used for a chip in the device, or the like. The device may be a device that supports only a function of formulating the control policy, or may be a device that supports both a function of formulating the control policy and another network function. This is not limited in this embodiment of this application.

Optionally, the network device in this embodiment of this application may be a device configured to execute the control policy formulated by the policy control network element, or may be used for a chip in the device, or the like. The device may be a device that supports only execution of the foregoing control policy, for example, a device configured to perform an access and mobility management function or a device configured to perform a session management (SM) function, or may be a device that supports both execution of the foregoing control policy and another network function. This is not limited in this embodiment of this application.

It should be noted that the policy control network element and the network device may be different communication devices, or may be different communication apparatuses, modules, or subsystems in a same communication device. This is not limited in this embodiment of this application.

Optionally, the terminal device (terminal) in this embodiment of this application may be a device configured to implement a wireless communication function, for example, a terminal, or a chip that may be used in the terminal. The terminal may be user equipment (UE), an access terminal, a terminal unit, a terminal station, a mobile station, a mobile console, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (SIP)

phone, a wireless local loop (WLL) station, a personal digital assistant (PDA), a handheld device having a wireless communication function, a computing device, another processing device connected to a wireless modem, a vehicle-mounted device, a wearable device, a virtual reality (VR) terminal device, an augmented reality (AR) terminal device, a wireless terminal in industrial control (industrial control), a wireless terminal in self driving, a wireless terminal in remote medical, a wireless terminal in a smart grid, a wireless terminal in transportation safety, a wireless terminal in a smart city, a wireless terminal in a smart home, or the like. The terminal may be mobile or fixed.

Optionally, the access network in this embodiment of this application generally includes a device configured to access a core network, for example, a base station, a broadband network gateway (BNG), an aggregation switch, or a non-3rd generation partnership project (3GPP) access device. The base station may include base stations in various forms, for example, a macro base station, a micro base station (also referred to as a small cell), a relay station, and an access point.

Optionally, the policy control network element or the network device in this embodiment of this application may also be referred to as a communication apparatus, and may be a general-purpose device or a dedicated device. This is not specifically limited in this embodiment of this application.

Optionally, a related function of the policy control network element or the network device in this embodiment of this application may be implemented by one device, may be jointly implemented by a plurality of devices, or may be implemented by one or more functional modules in one device. This is not specifically limited in this embodiment of this application. It may be understood that the foregoing function may be a function of a network element on a hardware device, may be a function of software running on dedicated hardware, may be a function of a combination of hardware and software, or may be a virtualization function instantiated on a platform (for example, a cloud platform).

Figure 5:
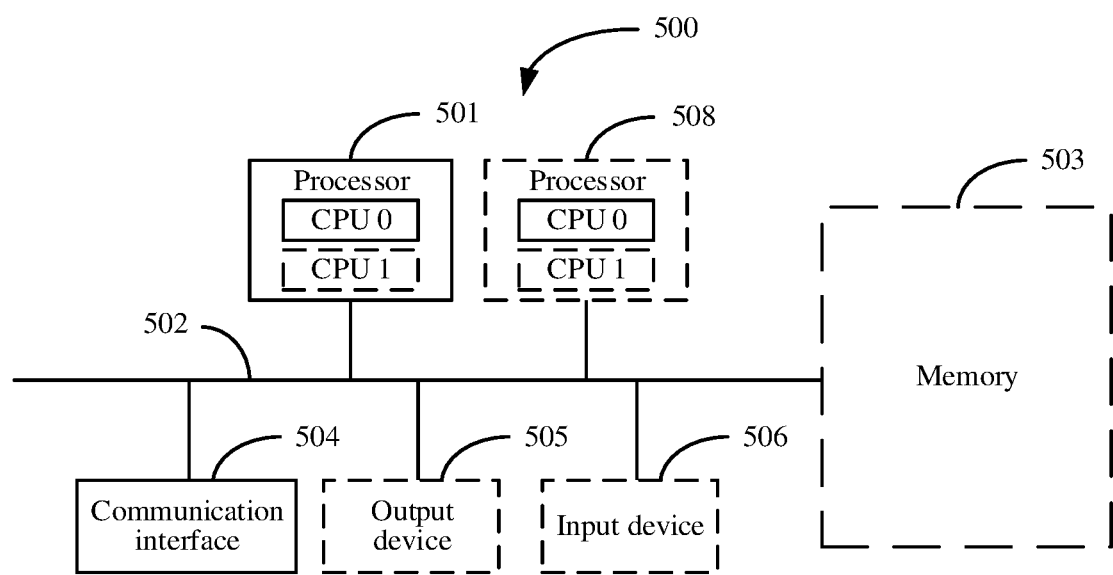
FIG. 5 is a schematic structural diagram of a communication device according to an embodiment of this application.

For example, the related function of the policy control network element or the network device in this embodiment of this application may be implemented by a communication device 500 in FIG. 5. FIG. 5 is a schematic structural diagram of the communication device 500 according to an embodiment of this application. The communication device 500 includes one or more processors 501, a communication line 502, and at least one communication interface (that a communication interface 504 and one processor 501 are included is merely an example for description in FIG. 5). Optionally, the communication device 500 may further include a memory 503.

The processor 501 may be a general-purpose central processing unit (CPU), a microprocessor, an application-specific integrated circuit (ASIC), or one or more integrated circuits configured to control program execution of the solutions of this application.

The communication line 502 may include a path used to connect different components.

The communication interface 504 may be a transceiver module configured to communicate with another device or a communication network such as the Ethernet, a RAN, or a wireless local area network (WLAN). For example, the transceiver module may be an apparatus such as a transceiver or a transceiver component. Optionally, the communication interface 504 may alternatively be a transceiver circuit located inside the processor 501, and is configured to implement signal input and signal output of the processor.

The memory 503 may be an apparatus having a storage function. For example, the memory 503 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, the memory 503 is not limited thereto. The memory may exist independently, and is connected to the processor by using the communication line 502. Alternatively, the memory may be integrated with the processor.

The memory 503 is configured to store computer instructions for performing the solutions of this application, and the processor 501 controls execution of the computer instructions. The processor 501 is configured to execute the computer instructions stored in the memory 503, to implement the communication method provided in the embodiments of this application.

Alternatively, optionally, in this embodiment of this application, the processor 501 may perform processing related functions in implementing the communication method provided in the following embodiments of this application, and the communication interface 504 is responsible for communication with another device or a communication network. This is not specifically limited in this embodiment of this application.

Optionally, the computer instructions in this embodiment of this application may also be referred to as application program code. This is not specifically limited in this embodiment of this application.

During specific implementation, in an embodiment, the processor 501 may include one or more CPUs, for example, a CPU 0 and a CPU 1 in FIG. 5.

During specific implementation, in an embodiment, the communication device 500 may include a plurality of processors, such as the processor 501 and a processor 508 in FIG. 5. Each of the processors may be a single-core (single-CPU) processor or a multi-core (multi-CPU) processor. The processor herein may refer to one or more devices, circuits, and/or processing cores configured to process data (for example, computer program instructions).

During specific implementation, in an embodiment, the communication device 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, or a projector (projector). The input device 506 communicates with the processor 501, and may receive an input from a user in a plurality of manners. For example, the input device 506 may be a mouse, a keyboard, a touchscreen device, a sensor device, or the like.

The communication device 500 sometimes may also be referred to as a communication apparatus, and may be a general-purpose device or a dedicated device. For example, the communication device 500 may be a desktop computer, a portable computer, a network server, a palmtop computer (PDA), a mobile phone, a tablet computer, a wireless terminal device, an embedded device, the foregoing terminal device, the foregoing network device, or a device having a structure similar to a structure shown in FIG. 5. A type of the communication device 500 is not limited in this embodiment of this application.

The following describes in detail a communication method provided in the embodiments of this application with reference to FIG. 4A to FIG. 5.

It should be noted that, in the following embodiments of this application, names of messages used for interaction between network elements, names of parameters in the messages, or the like are merely examples. Alternatively, names of services used for interaction, names of parameters in the services, or the like are merely examples, and there may be another name during specific implementation. This is not specifically limited in this embodiment of this application.

The communication system 300 shown in FIG. 3 may be applied to the 5G network architecture shown in any one of FIG. 4A to FIG. 4F, and is configured to perform the communication method provided in the embodiments of this application.

For example, the communication system 300 is applicable to the 5G network architecture in the non-roaming scenario shown in FIG. 4A or FIG. 4B. The policy control network element may be a PCF network element, and the network device may be an SMF network element or an AMF network element. The PCF network element formulates a control policy based on transport network information from the SMF network element or the AMF network element, and sends the formulated control policy to the SMF network element or the AMF network element. Specifically, the communication method provided in this embodiment of this application may be performed in a PDU session procedure.

For example, the communication system 300 may alternatively be applicable to the 5G network architecture in the local breakout roaming scenario shown in FIG. 4C or FIG. 4D. The policy control network element may be a V-PCF network element, and the network device may be a V-SMF network element or an AMF network element. The V-PCF network element formulates a control policy based on transport network information from the V-SMF network element or the AMF network element, and sends the formulated control policy to the V-SMF network element or the AMF network element. Specifically, the communication method provided in this embodiment of this application may be performed in a PDU session procedure.

For example, the communication system 300 may alternatively be applicable to the 5G network architecture in the home routed roaming scenario shown in FIG. 4E or FIG. 4F. The policy control network element may be an H-PCF network element, and the network device may be a V-SMF network element or an AMF network element. The H-PCF network element formulates a control policy based on transport network information from the V-SMF network element or the AMF network element, and sends the formulated control policy to the V-SMF network element or the AMF network element. Specifically, the communication method provided in this embodiment of this application may be performed in an AM policy control establishment/modification procedure.

The following separately uses the PDU session procedure and the AM policy control establishment/modification procedure provided in the embodiments of this application as examples to describe in detail the communication method provided in the embodiments of this application.

FIG. 6 to FIG. 8A and FIG. 8B each are a schematic diagram of a PDU session procedure according to an embodiment of this application. The communication method provided in the embodiments of this application may be performed in a process of performing any one of the PDU session procedures shown in FIG. 6 to FIG. 8A and FIG. 8B. For a non-roaming scenario, a PCF network element in FIG. 6 to FIG. 8A and FIG. 8B may be the PCF network element in FIG. 4A or FIG. 4B, an SMF network element in FIG. 6 to FIG. 8A and FIG. 8B may be the SMF network element in FIG. 4A or FIG. 4B, and an AMF network element in FIG. 6 to FIG. 8A and FIG. 8B may be the AMF network element in FIG. 4A or FIG. 4B. For a local breakout roaming scenario, a PCF network element in FIG. 6 to FIG. 8A and FIG. 8B may be the V-PCF network element in FIG. 4C or FIG. 4D, an SMF network element in FIG. 6 to FIG. 8A and FIG. 8B may be the V-SMF network element in FIG. 4C or FIG. 4D, and an AMF network element in FIG. 6 to FIG. 8A and FIG. 8B may be the AMF network element in FIG. 4C or FIG. 4D. For a home routed roaming scenario, a PCF network element in FIG. 6 to FIG. 8A and FIG. 8B may be the H-PCF network element in FIG. 4E or FIG. 4F, an SMF network element in FIG. 6 to FIG. 8A and FIG. 8B may be the H-SMF network element in FIG. 4E or FIG. 4F, and an AMF network element in FIG. 6 to FIG. 8A and FIG. 8B may be the AMF network element in FIG. 4E or FIG. 4F.

For ease of description, in related descriptions of the PDU session procedure, the PCF network element in FIG. 4A or FIG. 4B, the V-PCF network element in FIG. 4C or FIG. 4D, and the H-PCF network element in FIG. 4E or FIG. 4F are collectively referred to as the PCF network element, the SMF network element in FIG. 4A or FIG. 4B, the V-SMF network element in FIG. 4C or FIG. 4D, and the H-SMF network element in FIG. 4E or FIG. 4F are collectively referred to as the SMF network element, and the AMF network element in FIG. 4A or FIG. 4B, the AMF network element in FIG. 4C or FIG. 4D, and the AMF network element in FIG. 4E or FIG. 4F are collectively referred to as the AMF network element.

Figure 6:
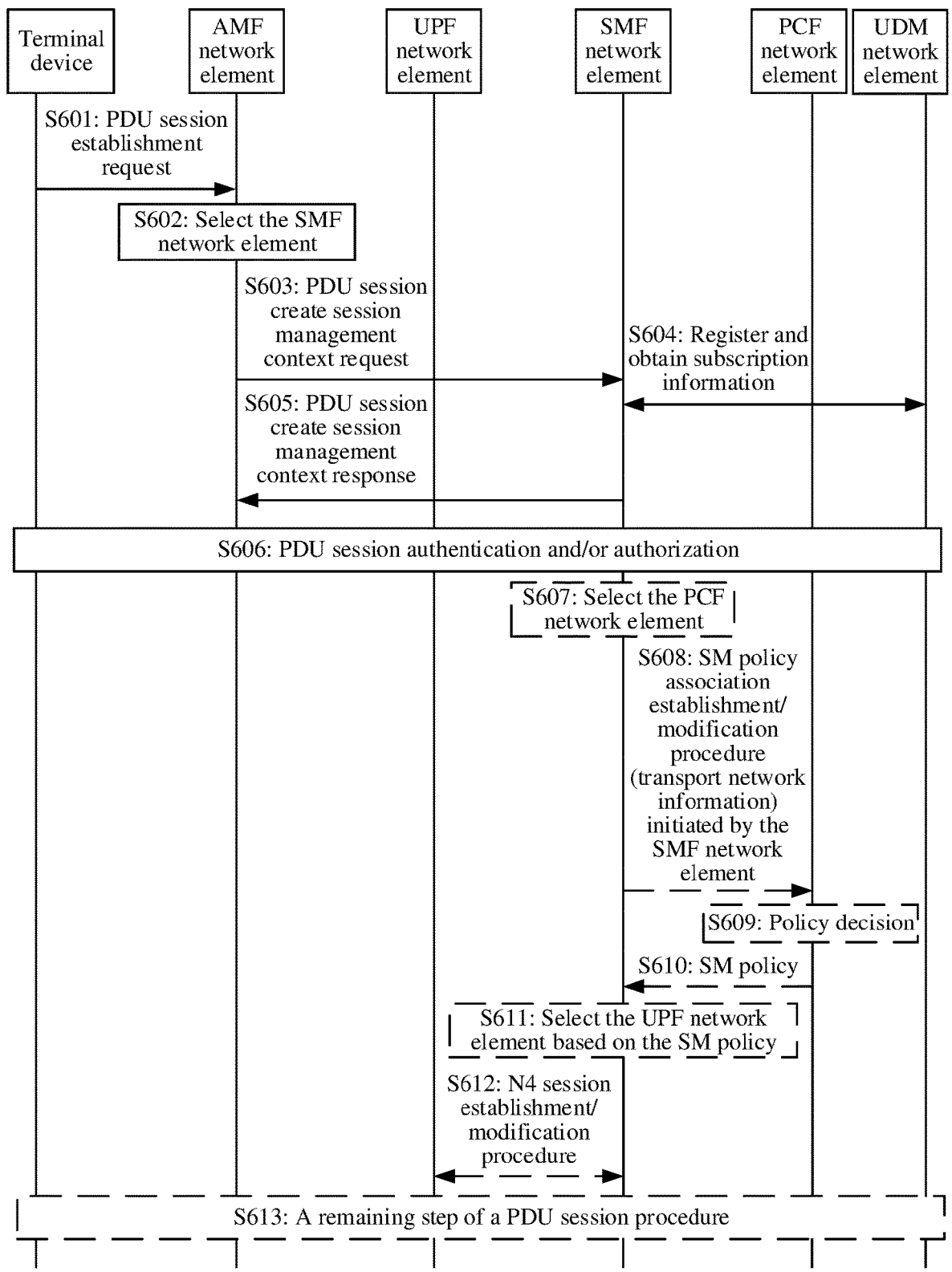
FIG. 6 is a schematic diagram 1 of a PDU session procedure according to an embodiment of this application.

FIG. 6 is a schematic diagram of a PDU session procedure according to this application. The PDU session procedure is used to implement a communication method in which transport network information is reported in a reporting manner 1. As shown in FIG. 6, the following steps may be included.

S601: A terminal device sends a PDU session establishment request (PDU session establishment request) to an AMF network element.

S602: The AMF network element selects an SMF network element.

S603: The AMF network element sends a PDU session create session management (SM) context request (Nsmf_P-DUSession_CreateSMContext Request) to the selected SMF network element.

In this embodiment of this application, the AMF network element may report a RAN identifier (RAN-ID) or transport network information to the SMF network element by using the PDU session create session management (SM) context request. The RAN-ID may be used by the AMF network element or the SMF network element to determine the transport network information.

Optionally, as shown in FIG. 4A to FIG. 4F, the AMF network element may receive the RAN-ID from the RAN device through the N2 interface, and report the received RAN-ID to the SMF network element by using the PDU session create session management (SM) context request.

Optionally, the transport network information may be configured in the AMF network element. After the AMF network element is powered on, the AMF network element can report the configured transport network information to the SMF network element.

Optionally, a correspondence between a RAN device accessed by UE and a transport network may be configured in the AMF network element, for example, a first correspondence between an identifier (RAN-ID) of the RAN device accessed by the UE and transport network information. The AMF network element may receive the RAN-ID from the RAN device through the N2 interface, determine the transport network information based on the first correspondence, and then report the transport network information to the SMF network element. For example, the AMF network element may receive the RAN-ID from the RAN device in a registration procedure.

S604: The SMF network element registers with a UDM network element, and obtains subscription information from the UDM network element. The subscription information may include a user plane security policy (UPSP).

S605: The SMF network element sends a PDU session create session management (SM) context response (PDU session create SM context response) to the AMF network element.

Optionally, the SMF network element may reject establishment of a PDU session in this step, and carry a cause value.

S606: PDU session authentication (authentication) and/or authorization (authorization).

When the transport network changes (for example, terminal mobility), the SMF network element may need to select a PCF network element. Therefore, optionally, the following S607 may further need to be performed in the PDU session procedure.

S607: The SMF network element selects a PCF network element.

It should be noted that when the terminal device accesses a network, the AMF network element also selects a PCF network element, and the PCF network element and the PCF network element selected by the SMF network element may be different PCF network elements.

When the transport network changes (for example, terminal mobility), the SMF network element further needs to report the transport network information to the PCF network element. Optionally, the SMF network element may report the transport network information in the PDU session procedure, or may report the transport network information by performing another procedure such as a cell handover procedure or a location update procedure. Therefore, optionally, the following S608 may further need to be performed in the PDU session procedure.

S608: Perform a session management (SM) policy association establishment/modification procedure initiated by the SMF network element.

Specifically, the SMF network element sends a session management (SM) policy control association establishment request (session management policy association establishment request) or a session management (SM) policy modification request (session management policy modification request) to the selected PCF network element, to request a session management (SM) policy, for example, a PCC rule. Correspondingly, the PCF network element sends a session management (SM) policy control association establishment response (session management policy association establishment response) or a session management (SM) policy modification response (session management policy modification response) to the SMF network element, to carry the requested session management (SM) policy, for example, the PCC rule.

With reference to FIG. 4A to FIG. 4F, the following describes in detail an obtaining manner of obtaining the transport network information by the SMF network element according to an embodiment of this application.

For example, the SMF network element may obtain the transport network information in one or more of the following obtaining manners.

In an obtaining manner 1, the transport network information may be configured in the SMF network element. After the SMF network element is powered on, the configured transport network information can be obtained. For example, the transport network information may be preconfigured in the SMF network element in a network deployment phase or a network optimization/upgrade phase.

In an obtaining manner 2, the SMF network element may receive the transport network information from the AMF network element.

For example, as shown in FIG. 6, the SMF network element may receive the transport network information from the AMF network element by using the PDU session create session management (SM) context request in S603. Optionally, the AMF network element may report new transport network information to the SMF network element when the transport network changes (for example, UE mobility). Optionally, the SMF network element may obtain the transport network information by subscribing to an event from the AMF network element.

Optionally, the transport network information from the AMF network element may be transport network information configured in the AMF network element and reported to the SMF network element after the AMF network element is powered on.

Optionally, the first correspondence between the RAN device accessed by the terminal device and the transport network may be configured in the AMF network element. After receiving the identifier (RAN-ID) of the RAN device reported by the RAN device, the AMF network element may obtain the transport network information based on the first correspondence.

For example, as shown in FIG. 4A to FIG. 4F, the AMF network element may receive the RAN-ID from the RAN device through the N2 interface.

In an obtaining manner 3, the SMF network element may receive the transport network information reported by the UPF network element. The transport network information reported by the UPF network element may be transport network information configured in the UPF network element and reported to the SMF network element after the UPF network element is powered on.

For example, as shown in FIG. 4A to FIG. 4F, the SMF network element may receive the transport network information from the UPF network element through the N4 interface.

In an obtaining manner 4, a second correspondence between the RAN device, the UPF network element, and the transport network may be configured in the SMF network element. After receiving the RAN-ID of the RAN device accessed by the terminal device from the AMF network element or the UPF network element, and receiving a UPF-ID from the UPF network element, the SMF network element determines the transport network information based on the second correspondence.

For example, as shown in FIG. 6, the SMF network element may receive the RAN-ID from the AMF network element by using the PDU session create session management (SM) context request in S603. As shown in FIG. 4A to FIG. 4F, the AMF network element may receive, through the N2 interface, the RAN-ID of the RAN device accessed by the terminal device. Optionally, the AMF network element may report new transport network information to the SMF network element when the RAN device serving the UE changes (for example, UE mobility). Optionally, the SMF network element may alternatively obtain the RAN-ID by subscribing to an event from the AMF network element.

For example, as shown in FIG. 4A to FIG. 4F, the SMF network element may receive the RAN-ID and the UPF-ID from the UPF network element through the N4 interface. As shown in FIG. 4A to FIG. 4F, the UPF network element may receive, through the N3 interface, the RAN-ID of the RAN device accessed by the terminal device.

In an obtaining manner 5, the transport network information may be determined based on quality of service QoS information of the transport network that is monitored by the SMF network element. The quality of service QoS information of the transport network may be information such as a value and/or stability of a transmission delay, a data rate, a transmission bandwidth, and a bit error rate that are/is introduced when the transport network provides a data transmission service for the terminal device in a process of performing the PDU session procedure.

Optionally, a third correspondence between the QoS information of the transport network and the transport network may be collected on or configured in the SMF network element, and the SMF network element independently determines the transport network information based on a change status of the QoS information of the transport network and the third correspondence.

Optionally, the SMF network element may alternatively send the monitored QoS information of the transport network to another network element, and the another network element determines the transport network information for the SMF network element. The another network element may be an NWDAF network element. For example, the SMF network element sends the monitored QoS information of the transport network to the NWDAF network element, and receives the transport network information from the NWDAF network element. The transport network information may be determined by the NWDAF network element based on the monitored QoS information of the transport network and the third correspondence.

It is easy to understand that the third correspondence may be preconfigured in the NWDAF network element, or may be obtained through statistics collection or analysis based on a historical record and stored in the NWDAF network element. This is not limited in this embodiment of this application.

In an obtaining manner 6, a fourth correspondence between the RAN device, the AMF network element, and the transport network information may be configured in the SMF network element. After receiving the RAN-ID and an AMF-ID from the AMF network element, the SMF network element may determine the transport network information based on the fourth correspondence.

For example, as shown in FIG. 6, the SMF network element may receive the RAN-ID and the AMF-ID from the AMF network element by using the PDU session create session management (SM) context request in S603. As shown in FIG. 4A to FIG. 4F, the AMF network element may receive, through the N2 interface in a registration procedure, the RAN-ID of the RAN device accessed by the terminal device. For the registration procedure, refer to an existing implementation. Details are not described herein again.

It should be noted that the SMF network element may obtain the transport network information in one or more of the foregoing obtaining manners. A specific implementation may be flexibly determined based on an actual application scenario. This is not limited in this embodiment of this application.

In this step, the SMF network element may report the transport network information to the PCF network element in the reporting manner 1.

For example, after the SMF network element is powered on, the SMF network element may independently report the transport network information to the PCF network element based on a preset reporting instruction by using the session management (SM) policy control association establishment request or the session management (SM) policy control association modification request in S608.

It should be noted that the preset reporting instruction may be preconfigured in an executable script of the SMF network element before delivery of the SMF network element or in a network deployment phase or in a network optimization/upgrade phase, may be configured in a control program of the SMF network element in an embedded manner, or may be configured in a configuration file that can be invoked by the control program of the SMF network element. This is not limited in this embodiment of this application.

S609: The PCF network element makes a policy decision.

For example, the PCF network element formulates an SM policy based on the transport network information reported by the SMF network element.

S610: The PCF network element delivers the formulated SM policy to the SMF network element.

For example, as shown in FIG. 4A, FIG. 4C, and FIG. 4E, the SMF network element may receive the SM policy from the PCF network element through a service-based interface Npcf provided by the PCF network element. Alternatively, for example, as shown in FIG. 4B, FIG. 4D, and FIG. 4F, the SMF network element may receive the SM policy from the PCF network element through the N7 interface.

S6ii: The SMF network element selects a UPF network element based on the SM policy.

If the SM policy formulated in S609 is different from an original SM policy, the SMF network element may further need to initiate a new N4 session procedure. Therefore, optionally, the PDU session procedure shown in FIG. 6 may further include S612.

S612: The SMF network element initiates an N4 session establishment/modification procedure. For a specific implementation, refer to an existing implementation. Details are not described herein.

S613: For a specific implementation of a remaining step in the PDU session procedure, refer to an existing implementation. Details are not described herein.

Figure 7A:
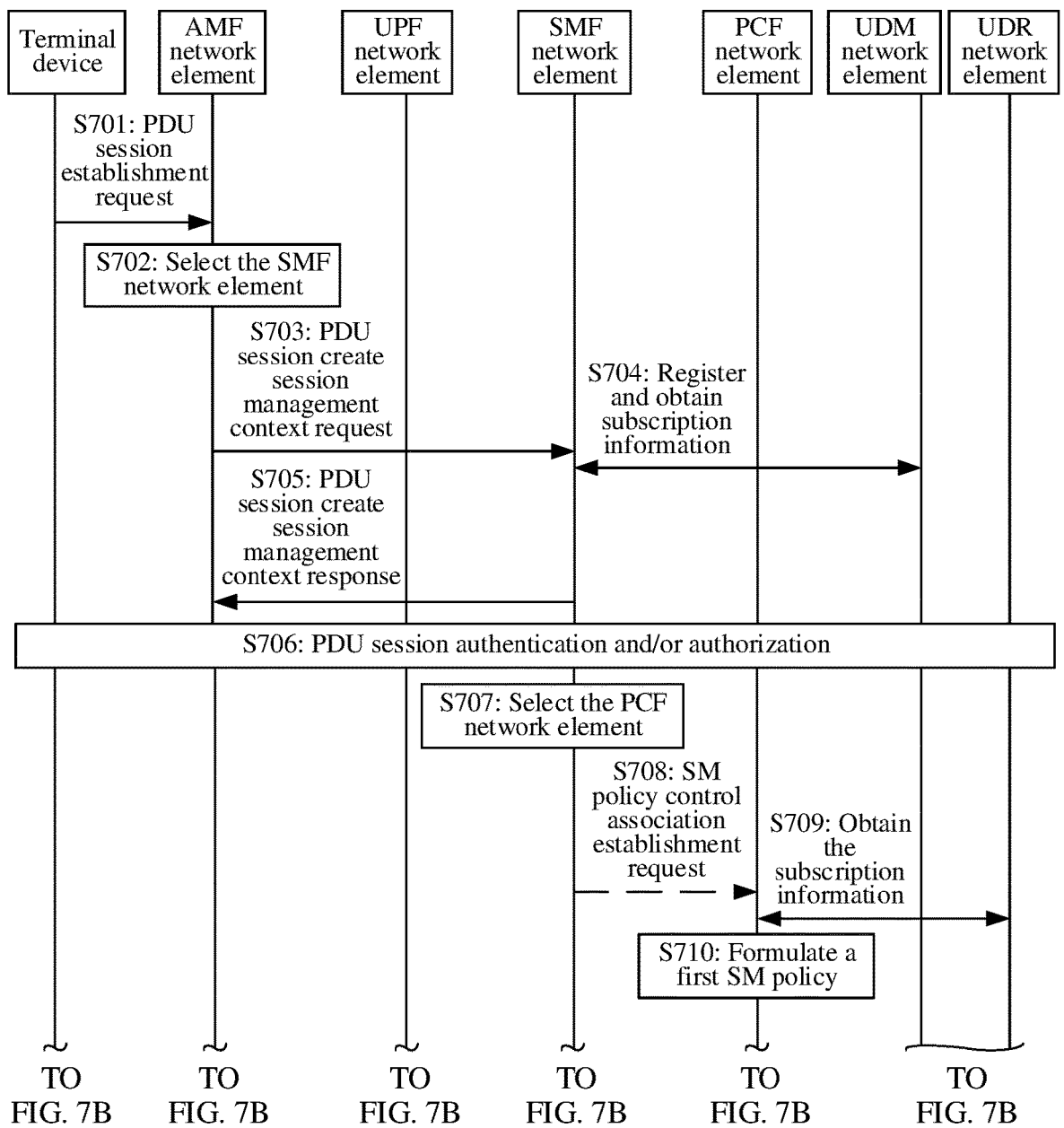
FIG. 7A and FIG. 7B are a schematic diagram 2 of a PDU session procedure according to an embodiment of this application.
Figure 7B:
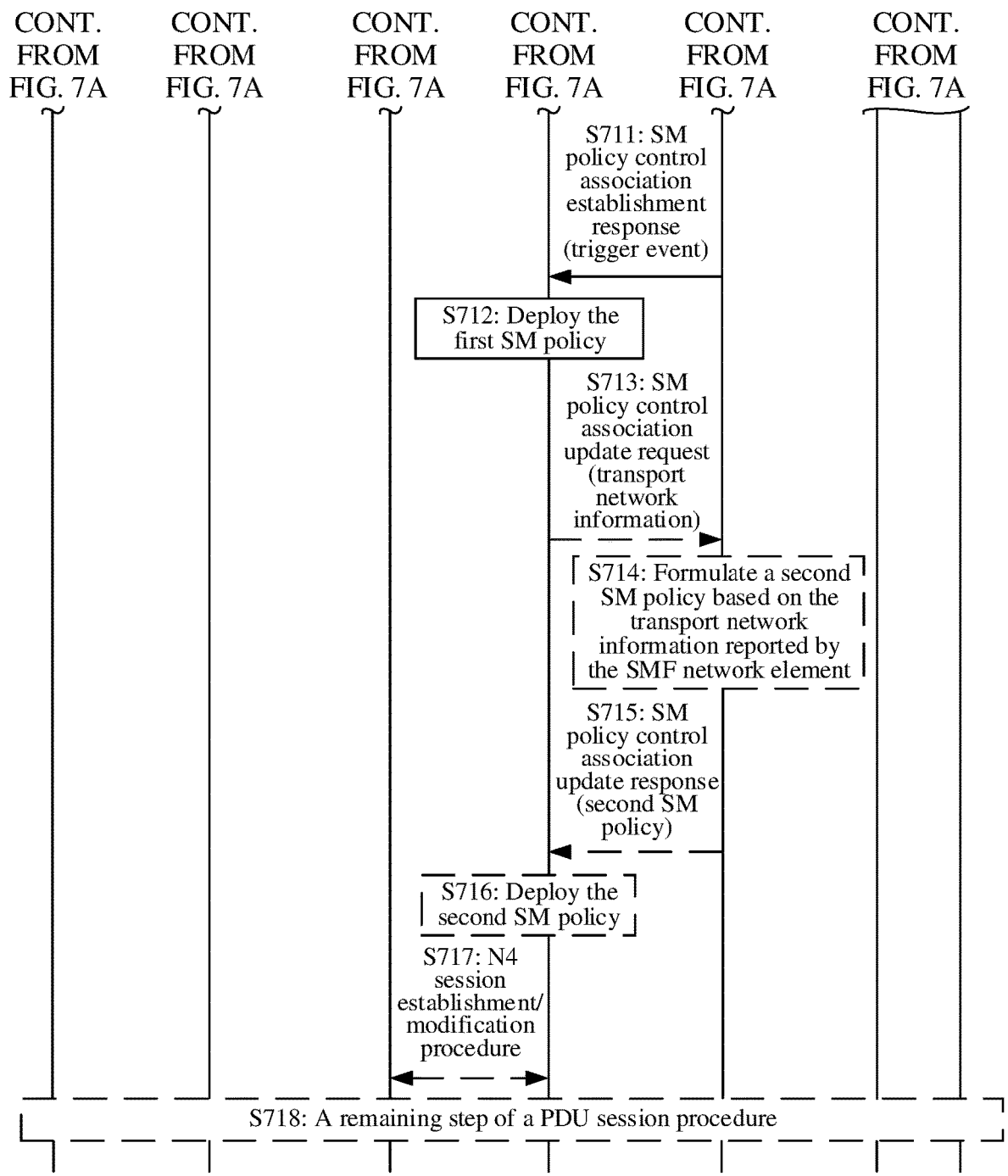

FIG. 7A and FIG. 7B are a schematic diagram of another PDU session procedure according to this application. The PDU session procedure is used to implement a communication method in which transport network information is reported in a reporting manner 2. As shown in FIG. 7A and FIG. 7B, the PDU session procedure may include the following steps.

For a specific implementation of S701 to S707, refer to S601 to S607. Details are not described herein again.

When a transport network changes (for example, terminal mobility), an SMF network element further needs to report transport network information to a PCF network element.

Optionally, the SMF network element may report the transport network information in the PDU session procedure, or may report the transport network information by performing another procedure such as a cell handover procedure or a location update procedure. Therefore, optionally, the following S708 may further need to be performed in the PDU session procedure.

S708: The SMF network element sends a session management (SM) policy control association establishment request to the PCF network element.

The session management (SM) policy control association establishment request may include information such as a subscription permanent identifier (SUPI), a data network name (DNN), and single network slice selection assistance information (S-NSSAI).

S709: The PCF network element interacts with a unified data repository (UDR) network element to obtain subscription information.

The subscription information may include a subscribed GBR.

For example, the PCF network element may obtain the subscription information by subscribing to an event notification from the UDR network element. The subscription event may be that delivered data changes.

S710: The PCF network element formulates a first SM policy based on information provided by the SMF network element and the UDR network element.

The first SM policy may include a PCC rule. Specific content of the PCC rule may include a delay parameter, a charging method, and the like.

S711: The PCF network element sends a session management (SM) policy control association establishment response to the SMF network element.

The session management (SM) policy control association establishment response includes the first SM policy and policy control information.

For example, as shown in FIG. 7A and FIG. 7B, the policy control information may include a trigger event for reporting the transport network information, and the trigger event is used to trigger the SMF network element to report the transport network information to the PCF network element.

For example, in a session management (SM) policy control association establishment procedure initiated by the SMF network element, the PCF network element may send the policy control information to the SMF network element by using the session management (SM) policy control association establishment response.

For example, the trigger event may include one or more events in a policy control request (PCR) trigger (trigger) form, for example, a transport network type change event and/or a transport network capability change event shown in Table 1. The transport network type may include: an optical fiber transport network, a low earth orbit (LEO) satellite transport network, a medium earth orbit (MEO) satellite transport network, a high earth orbit (HEO) satellite transport network, a geostationary earth orbit (GEO) satellite transport network, or the like.

TABLE 1

| Trigger event | Event example |
| --- | --- |
| Transport network type change event | A transport network type changes, and a changed transport network type such as the optical fiber transport network, LEO, MEO, HEO, and GEO is reported. |

TABLE 1-continued

| Trigger event | Event example |
| --- | --- |
| Transport network capability change event | A transmission delay change event, including a change in a value and a value range. For example, the value range is changed from 20 ms to 30 ms to 70 ms to 80 ms. A transmission bandwidth change event, including an increases or a decrease in a transmission bandwidth. |

S712: The SMF network element deploys the first SM policy. For a specific implementation, refer to an existing implementation. Details are not described herein.

Then, the SMF network element may further report the transport network information based on the trigger event, so that the PCF network element formulates and delivers a new SM policy based on the transport network information, and the SMF network element can adjust, based on the new SM policy, a used service mode during data transmission. Therefore, optionally, as shown in FIG. 7A and FIG. 7B, the PDU session procedure may further include one or more of the following S713 to S716.

S713: When the trigger event occurs, the SMF network element sends a session management (SM) policy control association update request to the PCF network element.

For example, the session management (SM) policy control association update request includes changed transport network information. For a manner of obtaining the transport network information, refer to related descriptions in S608. Details are not described herein again.

S714: The PCF network element formulates a second SM policy based on the transport network information reported by the SMF network element.

For example, the PCF network element may formulate the second SM policy based on the reported transport network information, for example, formulate a new PCC rule, or modify partial content of the first SM policy, for example, delete or modify partial content of an original PCC rule. The modification/deletion information of the new PCC rule or the original PCC rule may include: setting a delay parameter greater than or equal to a transport network delay, or setting a charging type to no charging.

S715: The PCF network element sends a session management (SM) policy control association update response to the SMF network element.

Optionally, the session management (SM) policy control association update response includes the second SM policy.

S716: The SMF network element deploys the second SM policy. For a specific implementation, refer to an existing implementation. Details are not described herein.

For details of S717 and S718, refer to S612 and S613. Details are not described herein again.

It should be noted that the policy control information is delivered by the PCF network element to the SMF network element by using the session management (SM) policy control association establishment response in S711, and the transport network information is reported by the SMF network element to the PCF network element by using the session management (SM) policy control association update request in S713. It is easy to understand that delivery of the policy control information and reporting of the transport network information may also be implemented by separately performing two session management (SM) policy control association update procedures. For example, the PCF network element may deliver the policy control information to the SMF network element by using a session management (SM) policy control association update response in a first session management (SM) policy control association update procedure. Correspondingly, the SMF network element may report the transport network information to the PCF network element by using a session management (SM) policy control association update request in a second session management (SM) policy control association update procedure. The second session management (SM) policy control association update procedure is performed after the first session management (SM) policy control association update procedure is performed.

In addition, FIG. 7A and FIG. 7B are described by using an example in which the trigger event is delivered in the session management (SM) policy control association establishment procedure (refer to S708 to S712) and the transport network information is reported in the session management (SM) policy control association update procedure (refer to S713 to S716) in the process of performing the PDU session procedure. Actually, provided that the transport network changes (for example, UE mobility), the session management (SM) policy control association update procedure can be started to report the transport network information. In other words, the session management (SM) policy control association update procedure may be performed in the process of performing the PDU session procedure (for example, establishment or modification), or may be performed in a process of performing another procedure such as a cell handover procedure or a location update procedure, or may be performed in combination with the session management (SM) policy control association establishment procedure, or may be separately performed. This is not limited in this embodiment of this application.

Figure 8A:
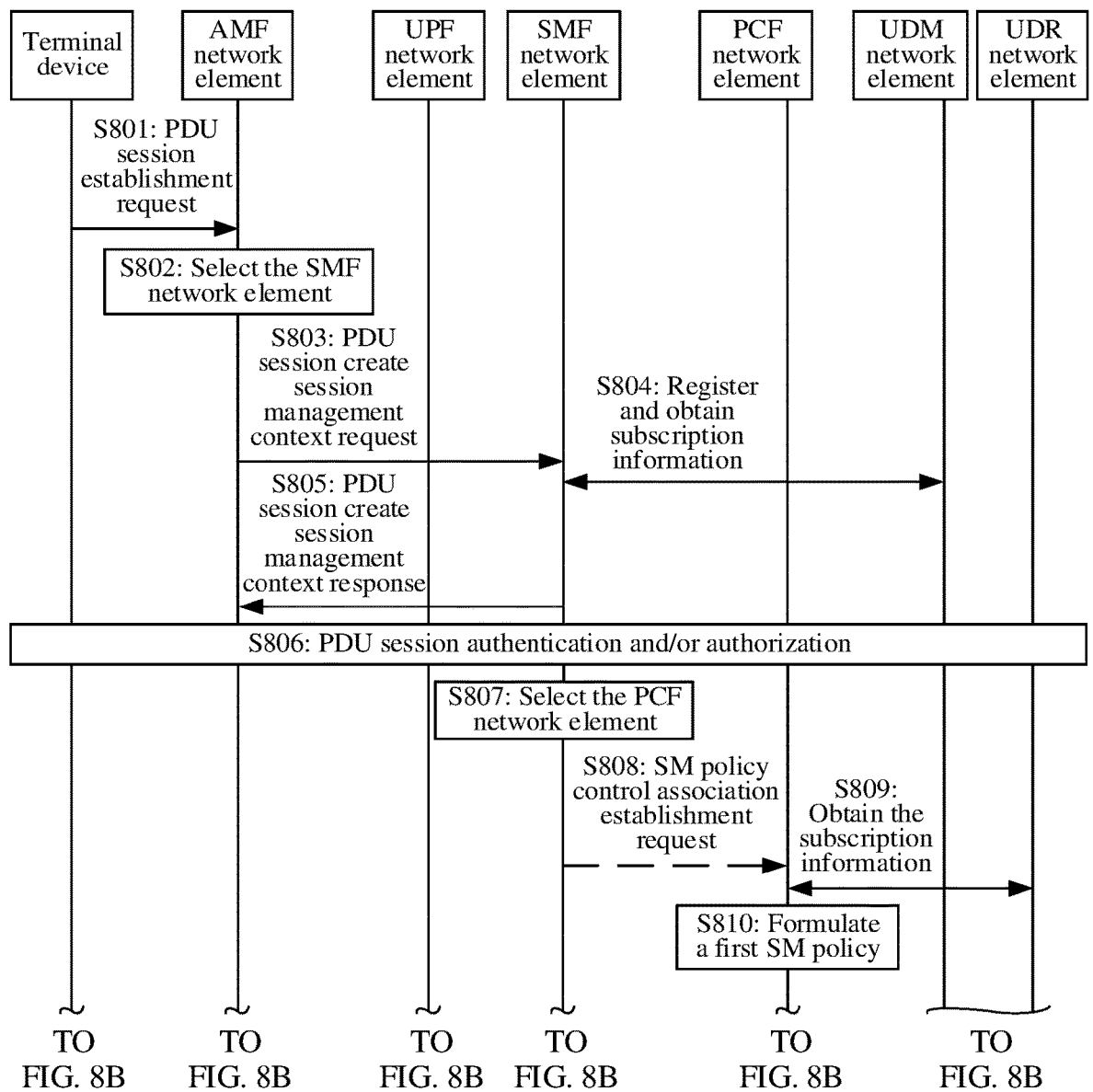
FIG. 8A and FIG. 8B are a schematic diagram 3 of a PDU session procedure according to an embodiment of this application.
Figure 8B:
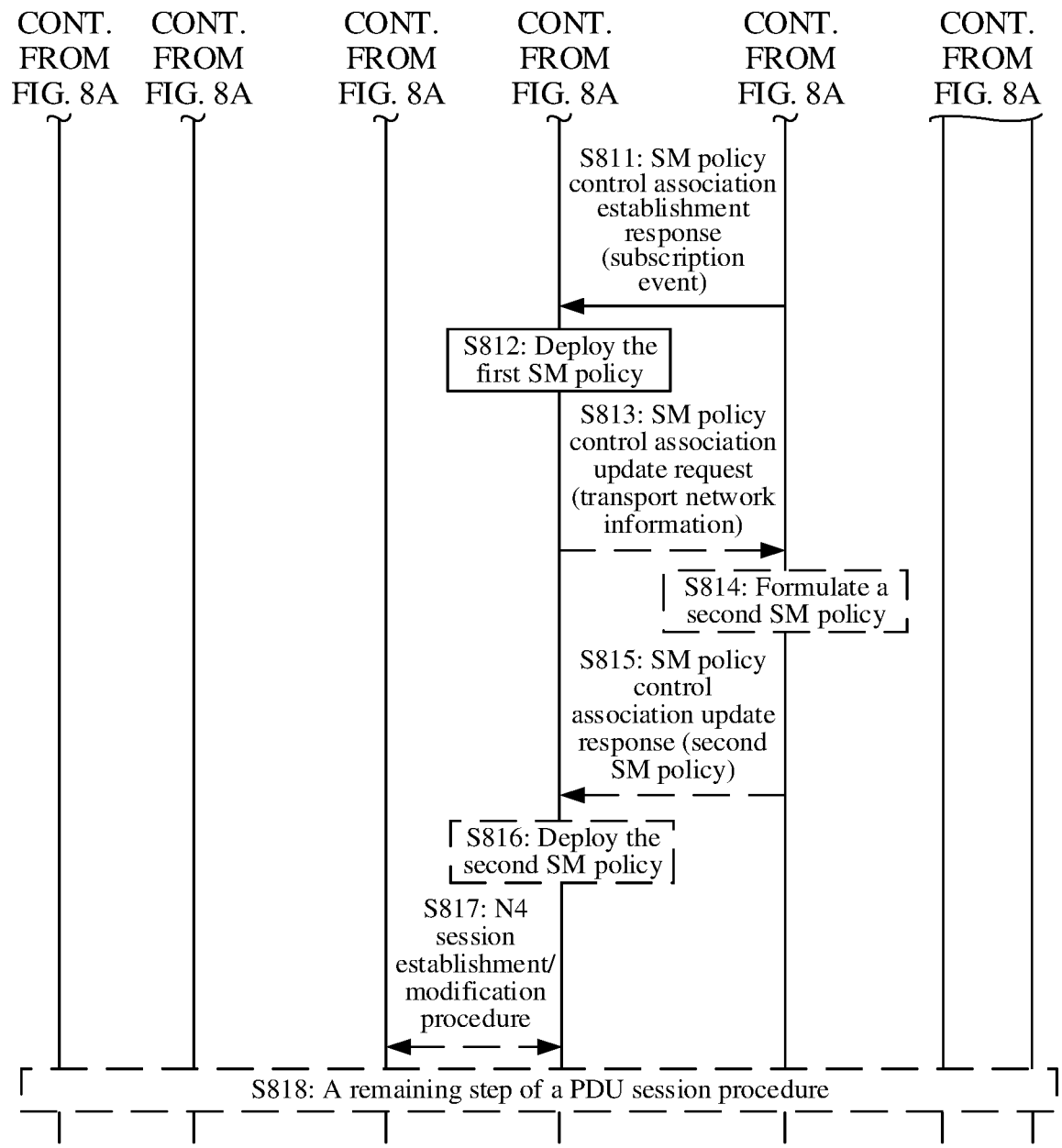

FIG. 8A and FIG. 8B are a schematic diagram of still another PDU session procedure according to this application. The PDU session procedure is used to implement a communication method in which transport network information is reported in a reporting manner 3. As shown in FIG. 8A and FIG. 8B, the PDU session procedure may include the following steps.

For a specific implementation of S801 to S810, refer to S701 to S710. Details are not described herein again.

S811: The PCF network element sends a session management (SM) policy control association establishment response to the SMF network element.

The session management (SM) policy control association establishment response includes a first SM policy and subscription notification information, and may be sent together with the subscription notification information (or separately sent) in an implementation. The PCF network element may subscribe to an event from the SMF network element at any time by using an event subscription service of the SMF network element. The PDU session establishment procedure is used only as an example for description herein.

For example, as shown in FIG. 8A and FIG. 8B, the subscription notification information may include a subscription event of reporting the transport network information, and the subscription event is used to subscribe to the transport network information reported by the SMF network element to the PCF network element.

For example, in a session management (SM) policy control association establishment procedure initiated by the SMF network element, the PCF network element may send the subscription notification information to the SMF network element by using the session management (SM) policy control association establishment response.

For example, the subscription event may include one or more events shown in Table 2, for example, a transport network type change event and/or a transport network capability change event.

TABLE 2

| Subscription event | Event example |
| --- | --- |
| Transport network type change event | A transport network type changes, and a changed transport network type such as the optical fiber, LEO, MEO, HEO, and GEO is reported. |
| Transport network capability change event | A transmission delay change event, including a change in a value and a value range. For example, the value range is changed from 20 ms to 30 ms to 70 ms to 80 ms. A transmission bandwidth change event, including an increases or a decrease in a transmission bandwidth. |

S812: The SMF network element deploys the first SM policy. For a specific implementation, refer to an existing implementation. Details are not described herein.

Then, the SMF network element may further report the transport network information based on the subscription event, so that the PCF network element formulates and delivers a new SM policy based on the reported transport network information, and the SMF network element can adjust, based on the new SM policy, a used service mode during data transmission. Therefore, optionally, as shown in FIG. 8A and FIG. 8B, the PDU session procedure may further include one or more of the following S813 to S816.

S813: When the subscription event occurs, the SMF network element sends a session management (SM) policy control association update request to the PCF network element.

For example, the session management (SM) policy control association update request includes changed transport network information. For a manner of obtaining the transport network information, refer to related descriptions in S608. Details are not described herein again.

For details of S814 to S818, refer to S714 to S718. Details are not described herein again.

It should be noted that the subscription notification information is delivered by the PCF network element to the SMF network element by using the session management (SM) policy control association establishment response in S811, and the transport network information is reported by the SMF network element to the PCF network element by using the session management (SM) policy control association update request in S813. It is easy to understand that delivery of the subscription notification information and reporting of the transport network information may also be implemented by separately performing two session management (SM) policy control association update procedures. For example, the PCF network element may deliver the policy control information to the SMF network element by using a session management (SM) policy control association update response in a first session management (SM) policy control association update procedure. Correspondingly, the SMF network element may report the transport network information to the PCF network element by using a session management (SM) policy control association update request in a second session management (SM) policy control association update procedure. The second session management (SM) policy control association update procedure is performed after the first session management (SM) policy control association update procedure is performed.

In this embodiment of this application, the SMF network element may report the transport network information in any one or more of the foregoing reporting manners. A specific implementation may be flexibly determined based on an actual application scenario. Details are not described herein again.

It should be noted that, the obtaining manner of obtaining the transport network information by the SMF network element and the reporting manner of reporting the transport network information by the SMF network element to the PCF network element may be used in combination, or may be used independently. This is not limited in this embodiment of this application. For example, the transport network information obtained in any one of the obtaining manners may be reported in any one of the reporting manners. For another example, the reporting manner 1 may be used in combination with the obtaining manner 1, or the reporting manner 2 may be used in combination with the obtaining manner 2.

In addition, in a process of performing the foregoing PDU session procedure, if the PCF network element selected by the AMF network element and the PCF network element selected by the SMF network element are a same PCF network element, and the AMF can also obtain the transport network information, the AMF network element may directly report the transport network information to the PCF network element. For example, the transport network information may be reported to the PCF network element based on a preset reporting instruction or a reporting instruction delivered by the PCF network element. For a specific implementation, refer to related descriptions of the reporting manner of reporting the transport network information by the SMF network element to the PCF network element, or refer to related descriptions of the reporting manner of reporting the transport network information by the AMF network element to the SMF network element in the following AM policy association establishment/modification procedure. Details are not described herein again.

In addition, FIG. 8A and FIG. 8B are described by using an example in which the subscription event is delivered in the session management (SM) policy control association establishment procedure (refer to S808 to S812) and the transport network information is reported in the session management (SM) policy control association update procedure (refer to S813 to S816) in the process of performing the PDU session procedure. Actually, provided that the transport network changes (for example, UE mobility), the session management (SM) policy control association update procedure can be started to report the transport network information. In other words, the session management (SM) policy control association update procedure may be performed in the process of performing the PDU session procedure (for example, modification or establishment), or may be performed in a process of performing another procedure such as a cell handover procedure or a location update procedure, or may be performed in combination with the session management (SM) policy control association establishment procedure, or may be separately performed. This is not limited in this embodiment of this application.

An action of the PCF network element or the SMF network element in any one of FIG. 6 to FIG. 8A and FIG. 8B may be performed by the processor 501 in the communication device 500 shown in FIG. 5 by invoking the application program code stored in the memory 503. This is not limited in this embodiment.

When a satellite transport network is a backup for redundancy, or when another transport network changes, terminal device-level flow control may need to be performed. In this case, a terminal device-level PCF network element needs to deliver a terminal policy or an AM policy that is used for flow control to a RAN or a terminal device. This can be achieved, for example, in a process of performing an AM policy association establishment/update procedure. The PCF network element directly connected to an AMF network element is the terminal device-level PCF network element, and the PCF network element directly connected to an SMF network element is a session-level PCF network element.

Figure 9:
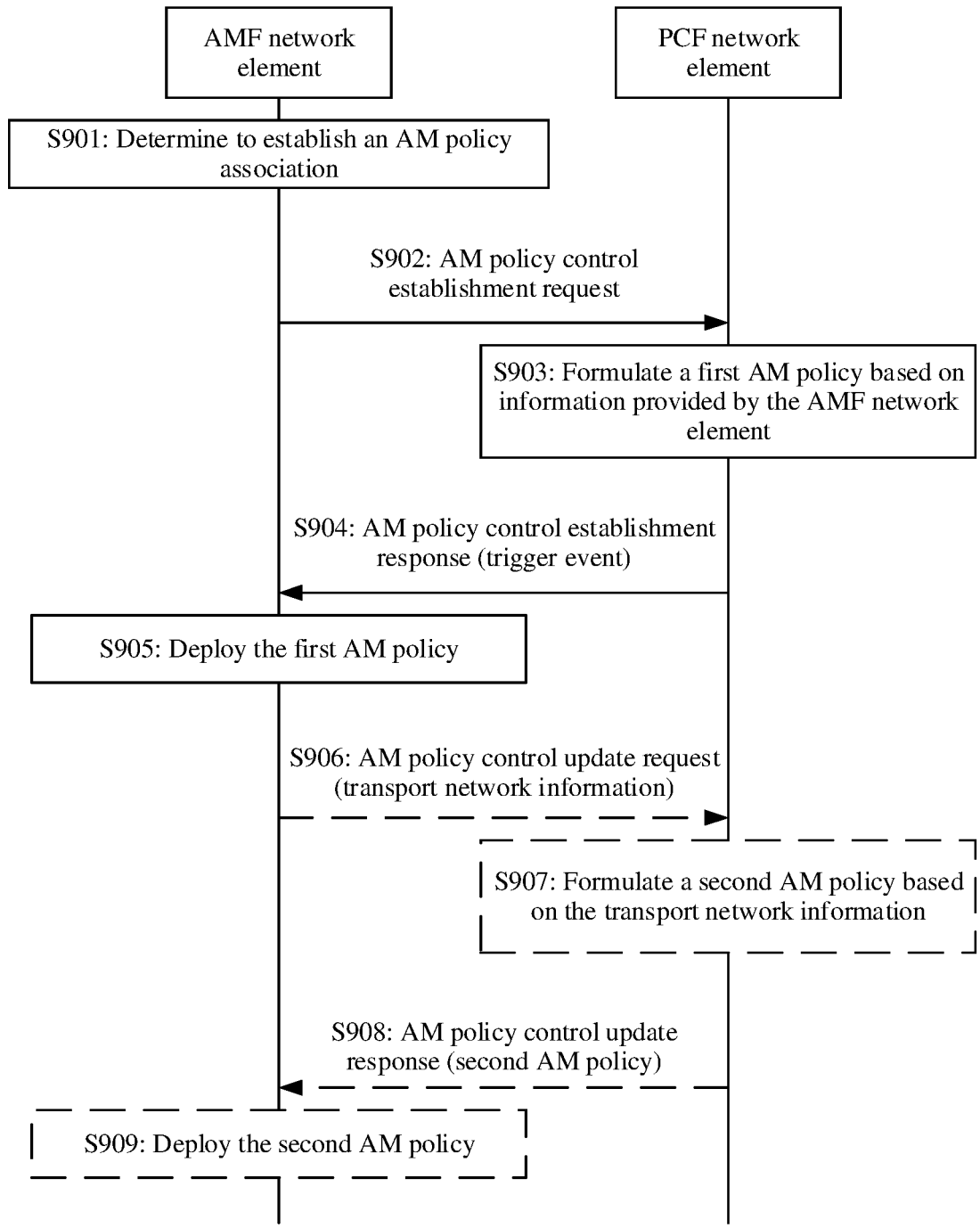
FIG. 9 is a schematic diagram 1 of an AM policy control establishment/update procedure according to an embodiment of this application.
Figure 10:
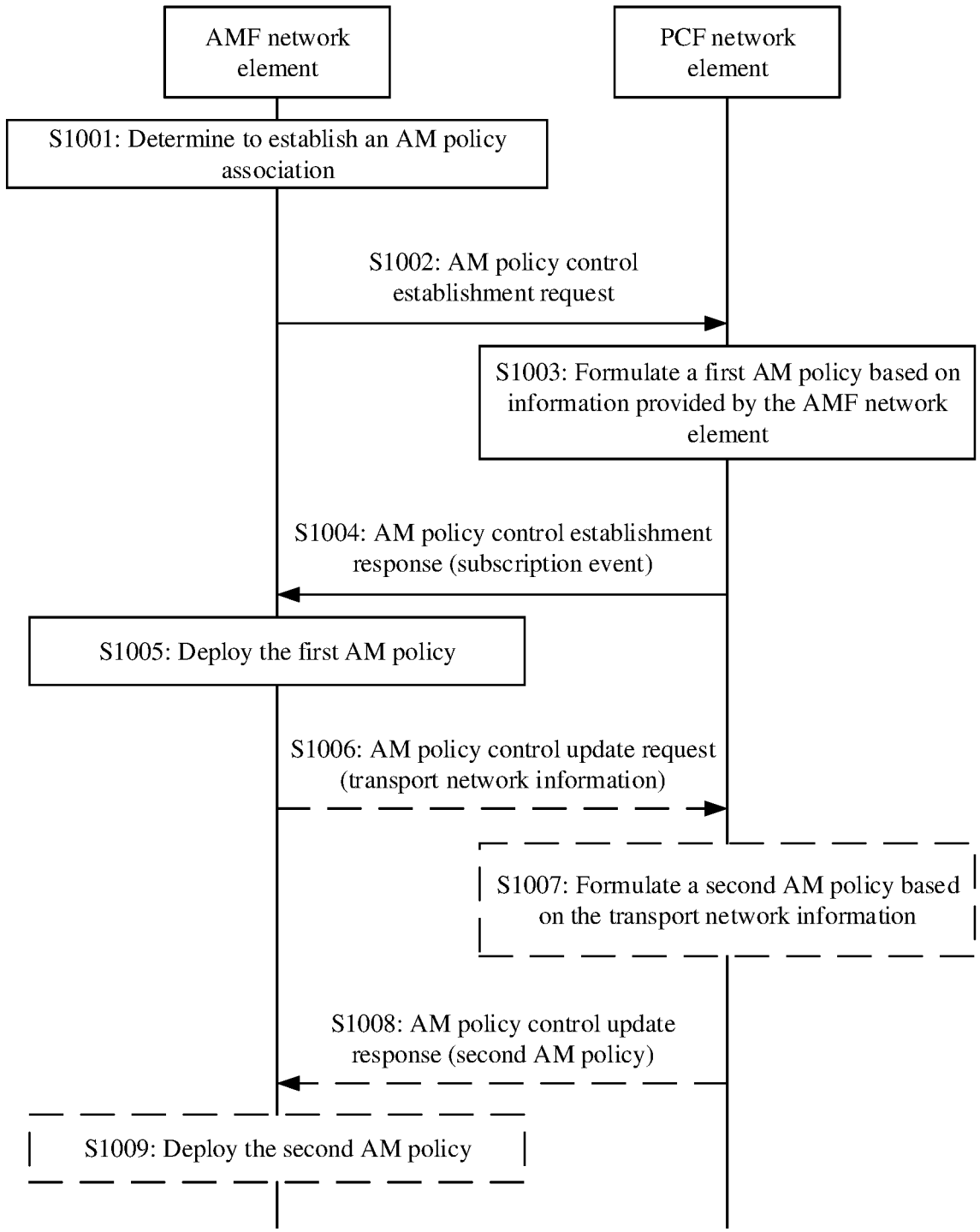
FIG. 10 is a schematic diagram 2 of an AM policy control establishment/update procedure according to an embodiment of this application.

FIG. 9 and FIG. 10 are each a schematic diagram of an AM policy association establishment/update procedure according to an embodiment of this application. The communication method provided in this embodiment of this application may be performed in a process of performing the AM policy association establishment/update procedure shown in FIG. 9 or FIG. 10. Optionally, when the PCF network element delivers/updates the terminal policy to the AMF network element, a UE policy association establishment/update procedure is established between the AMF network element and the PCF network element. Correspondingly, the term "AM policy" in FIG. 9 and FIG. 10 may be replaced with "terminal policy".

It should be noted that, in a non-roaming scenario, a PCF network element in FIG. 9 or FIG. 10 may be the PCF network element in FIG. 4A or FIG. 4B, an SMF network element in FIG. 9 or FIG. 10 may be the SMF network element in FIG. 4A or FIG. 4B, and an AMF network element in FIG. 9 or FIG. 10 may be the AMF network element in FIG. 4A or FIG. 4B. In a local breakout roaming scenario, a PCF network element in FIG. 9 or FIG. 10 may be the V-PCF network element in FIG. 4C or FIG. 4D, an SMF network element in FIG. 9 or FIG. 10 may be the V-SMF network element in FIG. 4C or FIG. 4D, and an AMF network element in FIG. 9 or FIG. 10 may be the AMF network element in FIG. 4C or FIG. 4D. In a home routed roaming scenario, a PCF network element in FIG. 9 or FIG. 10 may be the H-PCF network element in FIG. 4E or FIG. 4F, an SMF network element in FIG. 9 or FIG. 10 may be the H-SMF network element in FIG. 4E or FIG. 4F, and an AMF network element in FIG. 9 or FIG. 10 may be the AMF network element in FIG. 4E or FIG. 4F.

For ease of description, in related descriptions of the AM policy association establishment/update procedure shown in FIG. 9 or FIG. 10, the PCF network element in FIG. 4A or FIG. 4B, the V-PCF network element in FIG. 4C or FIG. 4D, and the H-PCF network element in FIG. 4E or FIG. 4F are collectively referred to as the PCF network element, the SMF network element in FIG. 4A or FIG. 4B, the V-SMF network element in FIG. 4C or FIG. 4D, and the H-SMF network element in FIG. 4E or FIG. 4F are collectively referred to as the SMF network element, and the AMF network element in FIG. 4A or FIG. 4B, the AMF network element in FIG. 4C or FIG. 4D, and the AMF network element in FIG. 4E or FIG. 4F are collectively referred to as the AMF network element.

As shown in FIG. 9, the AM policy association establishment/update procedure provided in this application may include the following steps.

S901: The AMF network element determines to establish an AM policy association.

S902: The AMF network element sends an AM policy control establishment request (Npcf_AMPolicyControl_Create Request) to the PCF network element.

S903: The PCF network element formulates a first AM policy based on information provided by the AMF network element.

For a specific implementation of S901 to S903, refer to an existing implementation. Details are not described herein again.

S904: The PCF network element sends an AM policy control establishment response (Npcf_AMPolicyControl_Create response Request) to the AMF network element.

For example, the AM policy control establishment response includes the first AM policy and policy control information. For the policy control information, refer to related descriptions in S711. Details are not described herein again.

S905: The AMF network element deploys the first AM policy. For this step, refer to an existing implementation. Details are not described herein again.

Then, the AMF network element may further report transport network information based on a trigger event, so that the PCF network element formulates and delivers a new AM policy based on the transport network information, and the AMF network element can adjust, based on the new AM policy, a used service mode during data transmission. Therefore, optionally, as shown in FIG. 9, the PDU session procedure may further include one or more of the following S906 to S909.

S906: The AMF network element sends an AM policy control update request (Npcf_AMPolicyControl_Update Request) to the PCF network element.

For example, the AMF network element may report, based on the policy control information, the transport network information to the PCF network element by using the AM policy control update request. For details, refer to related descriptions of the reporting manner 2 in FIG. 7A and FIG. 7B. Details are not described herein again.

With reference to FIG. 4A to FIG. 4F, the following describes in detail an obtaining manner of obtaining the transport network information by the AMF network element and a reporting manner of reporting the transport network information by the AMF network element to the PCF network element that are provided in the embodiments of this application.

For example, the AMF network element may obtain the transport network information in the following obtaining manner.

In an obtaining manner 7, the transport network information may be configured in the AMF network element. After the AMF network element is powered on, the configured transport network information can be obtained. For example, the transport network information may be configured in the AMF network element in a network deployment phase.

In an obtaining manner 8, a first correspondence between a RAN device accessed by a terminal device and a transport network may be configured in the AMF network element. After receiving a RAN device identifier (RAN-ID) reported by the RAN device, the AMF network element may obtain transport network information based on the first correspondence.

For example, as shown in FIG. 4A to FIG. 4F, the AMF network element may receive the RAN-ID from the RAN device through the N2 interface.

In an obtaining manner 9, the AMF network element may receive the transport network information from the SMF network element. Optionally, the AMF network element may obtain the transport network information by subscribing to an event from the SMF network element.

For example, as shown in FIG. 4A, FIG. 4C, and FIG. 4E, the AMF network element may receive the transport network information from the SMF network element through the N11 interface. Alternatively, for example, as shown in FIG. 4B, FIG. 4D, and FIG. 4F, the AMF network element may receive, through a service-based interface Nsmf provided by the SMF network element, the transport network information from the SMF network element.

Optionally, the transport network information reported by the SMF network element may be transport network information configured in the SMF network element and reported to the AMF network element after the SMF network element is powered on.

Optionally, the transport network information reported by the SMF network element may alternatively be transport network information obtained in the following manner: A second correspondence between the RAN device, a UPF network element, and the transport network is configured in the SMF network element. After receiving the RAN-ID of the RAN device from the AMF network element or the UPF network element and receiving a UPF-ID from the UPF network element, the SMF network element determines the transport network information based on the second correspondence.

For example, as shown in FIG. 4A, FIG. 4C, and FIG. 4E, the SMF network element may receive the RAN-ID from the AMF network element through the N11 interface. Alternatively, for example, as shown in FIG. 4B, FIG. 4D, and FIG. 4F, the SMF network element may receive the RAN-ID from the AMF network element through a service-based interface Namf provided by the AMF network element. As shown in FIG. 4A to FIG. 4F, the AMF network element may receive, through the N2 interface, the RAN-ID of the RAN device accessed by the terminal device.

For example, as shown in FIG. 4A to FIG. 4F, the SMF network element may receive the RAN-ID and the UPF-ID from the UPF network element through the N4 interface. As shown in FIG. 4A to FIG. 4F, the UPF network element may receive, through the N3 interface, the RAN-ID of the RAN device accessed by the terminal device.

Optionally, the transport network information from the SMF network element may alternatively be transport network information obtained in the following manner: The SMF network element receives the transport network information from the UPF network element. The transport network information from the UPF network element may be transport network information configured in the UPF network element and reported to the SMF network element after the UPF network element is powered on.

For example, as shown in FIG. 4A to FIG. 4F, the SMF network element may receive the transport network information from the UPF network element through the N4 interface.

In this embodiment of this application, the AMF network element may obtain the transport network information in one or more of the foregoing obtaining manners. A specific implementation may be flexibly determined based on an actual application scenario. This is not limited in this embodiment of this application.

S907: The PCF network element formulates a second AM policy based on the transport network information.

For example, an area such as an area in which a natural disaster occurs, a remote mountainous area, or a sea area may be set as a restricted area of the terminal device. The PCF network element may indicate that the terminal device in the restricted area can only receive paging, but cannot actively initiate a service.

S908: The PCF network element sends an AM policy control update response (Npcf_AMPolicyControl_Update response Request) to the AMF network element.

For example, the AMF network element may deliver the second AM policy to the AMF network element by using the AM policy control update response.

S909: The AMF deploys the second AM policy.

It should be noted that the policy control information is delivered by the PCF network element to the AMF network element by using the AM policy control establishment response in S904, and the transport network information is reported by the AMF network element to the PCF network element by using the AM policy control update request in S906. It is easy to understand that delivery of the policy control information and reporting of the transport network information may also be implemented by separately performing two AM policy association update procedures. For example, the PCF network element may deliver the policy control information to the AMF network element by using an AM policy control update response in a first AM policy association update procedure. Correspondingly, the AMF network element may report the transport network information to the PCF network element by using an AM policy control update request in a second AM policy association update procedure. The second AM policy association update procedure is performed after the first AM policy association update procedure is performed.

In addition, FIG. 9 is described by using an example in which the trigger event is delivered in the AM policy association establishment procedure (refer to S901 to S905) and the transport network information is reported in the AM policy association update procedure (refer to S906 to S909) in the process of performing the AM policy association establishment/update procedure. Actually, provided that the transport network changes (for example, UE mobility), a procedure for reporting the transport network information may be started according to a trigger event. In other words, the procedure for reporting the transport network information may be performed in the process of performing the AM policy association establishment/update procedure, or may be performed in another procedure such as a cell handover procedure or a location update procedure, or may be separately performed. This is not limited in this embodiment of this application.

As shown in FIG. 10, another AM policy association establishment/update procedure provided in this application may include the following steps.

For a specific implementation of S1001 to S1003, refer to S901 to S903. Details are not described herein again.

S1004: The PCF network element sends an AM policy control establishment response (Npcf_AMPolicyControl-_Create response Request) to the AMF network element.

For example, the AM policy control establishment response includes a first AM policy, and may be sent together with subscription notification information. For the subscription notification information, refer to related descriptions in S811. Details are not described herein again.

S1005: The AMF network element deploys the first AM policy. For this step, refer to an existing implementation. Details are not described herein again.

Then, the AMF network element may further report transport network information based on a subscription event, so that the PCF network element formulates and delivers a new AM policy based on the transport network information, and the AMF network element can adjust, based on the new AM policy, a used service mode during data transmission. Therefore, optionally, as shown in FIG. 10, the PDU session procedure may further include one or more of the following S1006 to S1009.

S1006: The AMF network element sends an AM policy control update request (Npcf_AMPolicyControl_Update Request) to the PCF network element.

For example, the AMF network element may report, based on the subscription notification information, the transport network information to the PCF network element by using the AM policy control update request. For details, refer to related descriptions of the reporting manner 3 in FIG. 8A and FIG. 8B. Details are not described herein again.

For a manner of obtaining the transport network information by the AMF network element, refer to related descriptions in S906. Details are not described herein again.

For a specific implementation of Slow to S1009, refer to S907 to S909. Details are not described herein again.

It should be noted that the subscription notification information is delivered by the PCF network element to the AMF network element by using the AM policy control establishment response in S1004, and the transport network information is reported by the AMF network element to the PCF network element by using the AM policy control update request in S1006. It is easy to understand that delivery of the subscription notification information and reporting of the transport network information may also be implemented by separately performing two AM policy association update procedures. For example, the PCF network element may deliver the subscription notification information to the AMF network element by using an AM policy control update response in a first AM policy association update procedure. Correspondingly, the AMF network element may report the transport network information to the PCF network element by using an AM policy association update request in a second AM policy association update procedure. The second AM policy association update procedure is performed after the first AM policy association update procedure is performed.

In addition, FIG. 10 is described by using an example in which the subscription event is delivered in the AM policy association establishment procedure (refer to S1001 to S1005) and the transport network information is reported in the AM policy association update procedure (refer to S1006 to S1009) in the process of performing the AM policy association establishment/update procedure. Actually, provided that the transport network changes (for example, UE mobility), a procedure for reporting the transport network information may be started according to a subscription event. In other words, the procedure for reporting the transport network information may be performed in the process of performing the AM policy association establishment/update procedure, or may be performed in another procedure such as a cell handover procedure or a location update procedure, or may be separately performed. This is not limited in this embodiment of this application.

An action of the PCF network element or the SMF network element in FIG. 9 and FIG. 10 may be performed by the processor 501 in the communication device 500 shown in FIG. 5 by invoking the application program code stored in the memory 503. This is not limited in this embodiment.

It may be understood that, in the foregoing embodiments, the methods and/or steps implemented by the network device may also be implemented by a component (for example, a chip or a circuit) that may be used for the network device, and the methods and/or steps implemented by the policy control network element may also be implemented by a component (for example, a chip or a circuit) that may be used for the policy control network element.

The foregoing mainly describes the solutions provided in the embodiments of this application from a perspective of interaction between the network elements. Correspondingly, an embodiment of this application further provides a communication apparatus, and the communication apparatus is configured to implement the foregoing methods. The communication apparatus may be the network device in the foregoing method embodiments, or an apparatus including the foregoing network device, or a component that can be used for the network device. Alternatively, the communication apparatus may be the policy control network element in the foregoing method embodiment, or an apparatus including the policy control network element, or a component that can be used for the policy control network element. It can be understood that, to implement the foregoing functions, the communication apparatus includes a corresponding hardware structure and/or software module for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that division into modules in the embodiments of this application is an example, and is merely a logical function division. During actual implementation, another division manner may be used.

Figure 11:
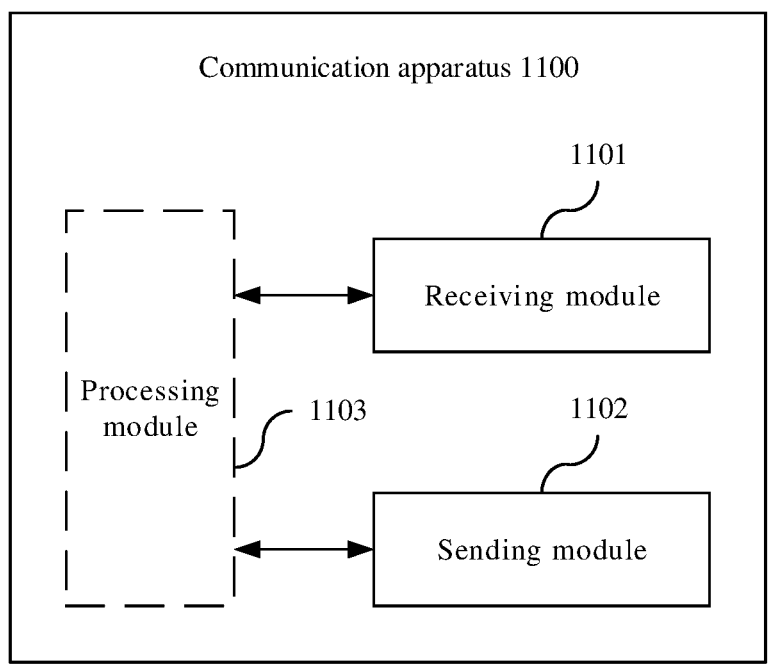
FIG. 11 is a schematic structural diagram of a communication apparatus according to an embodiment of this application.

For example, FIG. 11 is a schematic structural diagram of a communication apparatus 1100. The communication apparatus 1100 includes a receiving module 1101 and a sending module 1102. The receiving module 1101 and the sending module 1102 may be disposed separately, or may be disposed together. When the receiving module 1101 and the sending module 1102 are combined into one module, the module may be referred to as a transceiver module, a transceiver unit, or the like, and is configured to implement a sending function and/or a receiving function of the communication apparatus 1100, for example, may be a transceiver circuit, a transceiver machine, a transceiver, or a communication interface.

For example, the communication apparatus 1100 may be the network device in the foregoing method embodiment. The sending module 1102 is configured to send transport network information to a policy control network element. The receiving module 1101 is configured to receive a control policy from the policy control network element. The transport network information is used by the policy control network element to formulate the control policy.

For example, the transport network information includes a type and/or a capability of a transport network.

In a possible design, the receiving module 1101 is further configured to receive policy control information from the policy control network element. The policy control information includes a trigger event for reporting the transport network information, and the trigger event is used to trigger the network device to report the transport network information to the policy control network element.

In another possible design, the receiving module 1101 is further configured to receive subscription notification information from the policy control network element. The subscription notification information includes a subscription event of reporting the transport network information, and the subscription event is used to subscribe to the transport network information reported by the network device to the policy control network element.

In one aspect, the network device may be a session management (SM) function network element. Correspondingly, the control policy may include a session management (SM) policy. The session management (SM) policy includes at least one of the following: adjusting a transmission delay parameter to a value greater than or equal to a transport network delay, setting a charging type to no charging, and allowing transmission of a part of services.

Figure 1:
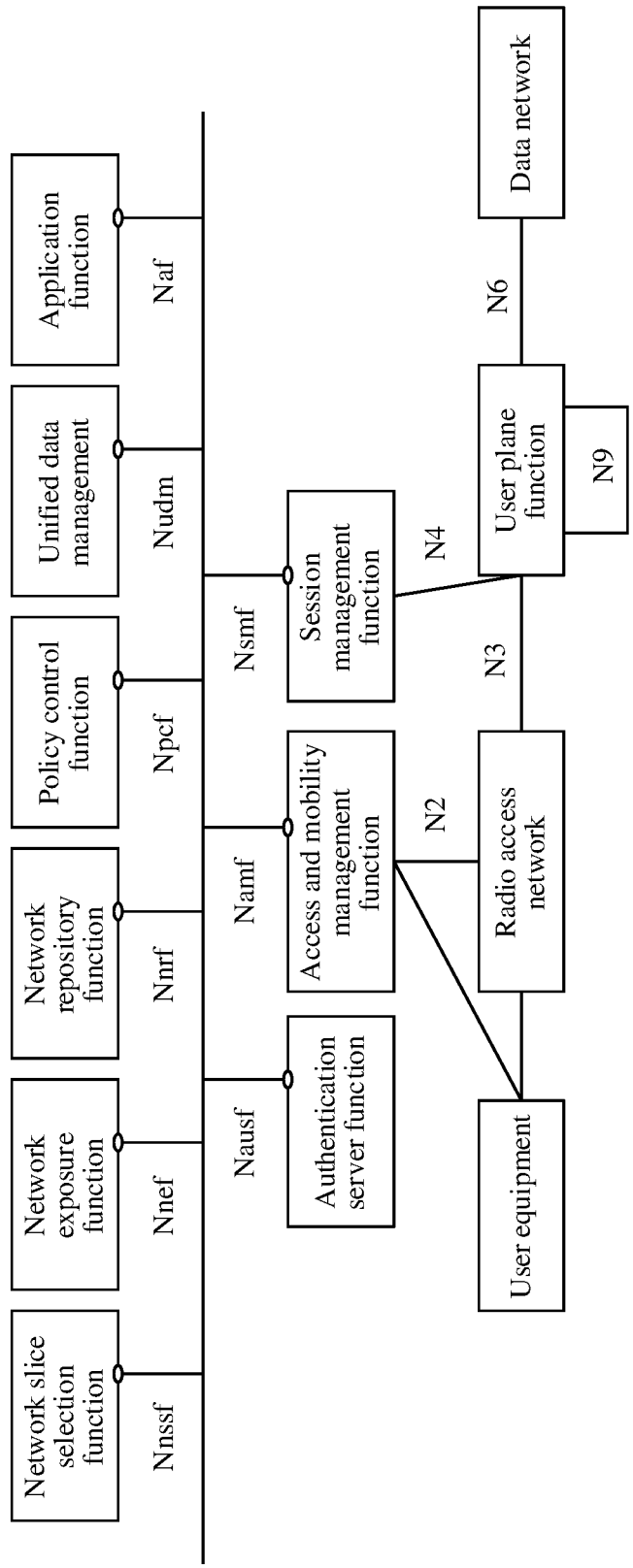
FIG. 1 is a schematic architectural diagram of a policy control mechanism in an existing 5G communication system.

Optionally, as shown in FIG. 1i, the communication apparatus 1100 may further include a processing module 1103. The receiving module 1101 is further configured to receive a user plane function network element identifier from a user plane function network element. The processing module 1103 is configured to determine the transport network information based on the user plane function network element identifier.

Optionally, the receiving module 1101 is further configured to receive the transport network information from a user plane function network element.

Optionally, the receiving module 1101 is further configured to receive the transport network information from an access and mobility management network element.

Optionally, the receiving module 1101 is further configured to receive a radio access network identifier from an access and mobility management network element or a user plane function network element. Correspondingly, the processing module 1103 is configured to determine the transport network information based on the radio access network identifier.

Optionally, the processing module 1103 is configured to: monitor quality of service QoS, and determine, based on monitored QoS information, the transport network information independently or request another network element to determine the transport network information based on monitored QoS information. The QoS information may include delay information of the transport network.

Optionally, the processing module 1103 may be configured to independently determine the transport network information based on the monitored QoS information.

Alternatively, optionally, the sending module 1102 may be further configured to send the monitored QoS information to a network data analytics function network element. Optionally, the receiving module 1101 is further configured to receive the transport network information from the network data analytics function network element.

In another aspect, the network device may alternatively be an access and mobility management network element. Correspondingly, the control policy may include at least one of the following: a terminal policy or an access and mobility management policy.

For example, the terminal policy includes at least one of the following: only allowing a terminal to initiate a session to a specified data network or a single network slice selection assistance information network element, or forbidding a terminal device to transmit data in a radio access manner.

For example, the access and mobility management policy may include: forbidding a terminal in a restricted area to actively initiate a service.

Specifically, when the network device is the access and mobility management network element, the network device may obtain the transport network information in any one of the following manners.

Optionally, the receiving module 1101 may be further configured to receive the transport network information from a session management (SM) function network element.

Optionally, the receiving module 1101 may be further configured to: receive a radio access network identifier from a radio access network, and determine the transport network information based on the radio access network identifier.

Optionally, the receiving module 1101 may be further configured to forward the control policy to the radio access network, so that the radio access network configures and implements the control policy.

For example, the communication apparatus 1100 may alternatively be the policy control network element in the foregoing method embodiment. The receiving module 1101 is configured to receive transport network information from a network device. The processing module 1103 is configured to formulate a control policy based on the transport network information. The sending module 1102 is configured to send the control policy to the network device.

For example, the transport network information includes a type and/or a capability of a transport network.

The sending module 1102 is further configured to send policy control information to the network device. The policy control information includes a trigger event for reporting the transport network information, and the trigger event is used to trigger the network device to report the transport network information to the policy control network element.

The sending module 1102 is further configured to send subscription notification information to the network device. The subscription notification information includes a subscription event of reporting the transport network information, and the subscription event is used to subscribe to the transport network information reported by the network device to the policy control network element.

In a possible design, the network device may be a session management (SM) function network element. Correspondingly, the control policy may include a session management (SM) policy. The session management (SM) policy may include at least one of the following: adjusting a transmission delay parameter to a value greater than or equal to a transport network delay, setting a charging type to no charging, and allowing transmission of a part of services.

In another possible design, the network device may alternatively be an access and mobility management network element. Correspondingly, the control policy may include at least one of the following: a terminal policy or an access and mobility management policy.

For example, the terminal policy includes at least one of the following: only allowing a terminal to initiate a session to a specified data network or a single network slice selection assistance information network element, or forbidding a terminal to transmit data in a radio access manner.

For example, the access and mobility management policy may include: forbidding a terminal in a restricted area to actively initiate a service.

All related content of the steps in the foregoing method embodiments may be cited in function descriptions of corresponding functional modules. Details are not described herein again.

In this embodiment, the communication apparatus 1100 is presented in a form of functional modules obtained through integration. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus 1100 may be in a form of the communication device 500 shown in FIG. 5.

For example, the processor 501 in the communication device 500 shown in FIG. 5 may invoke the computer-executable instructions stored in the memory 503, so that the communication device 500 performs the communication method in the foregoing method embodiments.

Specifically, a function/an implementation processes of the processing module 1103 in FIG. 11 may be implemented by the processor 501 in the communication device 500 shown in FIG. 5 by invoking the computer-executable instructions stored in the memory 503. Alternatively, a function/an implementation processes of the processing module 1103 in FIG. 11 may be implemented by the processor 501 in the communication device 500 shown in FIG. 5 by invoking the computer-executable instructions stored in the memory 503, and a function/an implementation process of the receiving module 1101 or the sending module 1102 in FIG. 11 may be implemented by using the communication interface 504 in the communication device 500 shown in FIG. 5.

The communication apparatus 1100 provided in this embodiment may be configured to perform the communication method provided in this application. Therefore, for technical effects that can be obtained by the apparatus, refer to the foregoing method embodiments. Details are not described herein again.

It should be noted that one or more of the foregoing modules or units may be implemented by using software, hardware, or a combination thereof. When any one of the foregoing modules or units is implemented by software, the software exists in a form of computer program instructions that are stored in a memory. The processor may be configured to execute the program instructions to implement the foregoing method procedures. The processor may be built in an SoC (system-on-a-chip) or an ASIC, or may be an independent semiconductor chip. In addition to a core used to perform an operation or processing by executing the software instructions, the processor may further include a necessary hardware accelerator, for example, a field programmable gate array (field programmable gate array, FPGA), a PLD (programmable logic device), or a logic circuit that implements a dedicated logic operation.

When the foregoing modules or units are implemented by using hardware, the hardware may be any one of or any combination of a CPU, a microprocessor, a digital signal processing (DSP) chip, a micro control unit (MCU), an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described herein with reference to the embodiments, in a procedure of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, it is clear that various modifications and combinations may be made to this application without departing from the spirit and scope of this application. Correspondingly, this specification and the accompanying drawings are merely example descriptions of this application defined by the appended claims, and are considered as any of or all modifications, variations, combinations, or equivalents that cover the scope of this application. It is clear that, a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A communication method, comprising:
sending, by a policy control network element, policy control information to a network device, wherein the policy control information indicates a trigger event for reporting transport network information, wherein the trigger event triggers the network device to report the transport network information to the policy control network element, and wherein the trigger event comprises a transport network type change event;
receiving, by the policy control network element, the transport network information from the network device, wherein the transport network information indicates a type of a transport network, wherein the type of the transport network is one of an optical fiber transport network, or a satellite transport network, and wherein the transport network type change event is associated with a change in the type of the transport network;
formulating, by the policy control network element, a control policy based on the transport network information; and
sending, by the policy control network element, the control policy to the network device.

2. The communication method according to claim 1, wherein the trigger event comprises one or more events in a policy control request (PCR) trigger form.

3. The communication method according to claim 2, wherein a type of the satellite transport network is one of a low earth orbit (LEO) satellite transport network, a medium earth orbit (MEO) satellite transport network, a high earth orbit (HEO) satellite transport network, a geostationary earth orbit (GEO) satellite transport network.

4. The communication method according to claim 1, wherein the network device is a session management function network element, and the control policy comprises a session management policy; and
wherein the session management policy comprises adjusting a transmission delay parameter to a value greater than or equal to a transport network delay.

5. The communication method according to claim 1, further comprising:
receiving, by the network device, the policy control information from the policy control network element; and
sending, by the network device, the transport network information to the policy control network element.

6. A communication method, comprising:
receiving, by a network device, policy control information from a policy control network element, wherein the policy control information indicates a trigger event for reporting transport network information, wherein the trigger event is for triggering the network device to report the transport network information to the policy control network element, and wherein the trigger event comprises a transport network type change event;
sending, by the network device, transport network information to the policy control network element, wherein the transport network information is for formulating a control policy and indicates a type of a transport network, wherein the type of the transport network is one of an optical fiber transport network, or a satellite transport network, and wherein the transport network type change event is associated with a change in the type of the transport network; and receiving, by the network device, the control policy from the policy control network element.

7. The communication method according to claim 6, wherein the trigger event comprises one or more events in a policy control request (PCR) trigger form.

8. The communication method according to claim 6, wherein the network device is a session management function network element, and the control policy comprises a session management policy.

9. A communication apparatus, comprising:
at least one processor; and
a non-transitory computer computer-readable storage medium coupled to the at least one processor and storing a program for execution by the at least one processor, the program including instructions to:
send policy control information to a network device, wherein the policy control information indicates a trigger event for reporting transport network information, wherein the trigger event is for triggering the network device to report the transport network information to the communication apparatus, wherein the transport network information indicates a type of a transport network, wherein the trigger event comprises a transport network type change event, wherein the type of the transport network is one of an optical fiber transport network or a satellite transport network, and wherein the transport network type change event is associated with a change in type of the transport network;
receive the transport network information from the network device;
formulate a control policy based on the transport network information; and
send the control policy to the network device.

10. The communication apparatus according to claim 9, wherein the trigger event comprises one or more events in a policy control request (PCR) trigger form.

11. The communication apparatus according to claim 10, wherein a type of satellite transport network is one of a low earth orbit (LEO) satellite transport network, a medium earth orbit (MEO) satellite transport network, a high earth orbit (HEO) satellite transport network, a geostationary earth orbit (GEO) satellite transport network.

12. The communication apparatus according to claim 9, wherein the transport network information comprises a capability of a transport network, wherein the trigger event comprises a transport network capability change event.

13. The communication apparatus according to claim 9, wherein the network device is a session management function network element, and the control policy comprises a session management policy.

14. The communication apparatus according to claim 13, wherein the session management policy comprises adjusting a transmission delay parameter to a value greater than or equal to a transport network delay.

15. A communication apparatus, comprising:
at least one processor; and
a non-transitory computer computer-readable storage medium coupled to the at least one processor and a program for execution by the at least one processor, the program including instructions to:
receive policy control information from a policy control network element, wherein the policy control information indicates a trigger event for reporting transport network information, and the trigger event is for triggering the communications apparatus to report the transport network information to the policy control network element, wherein the transport network information indicates a type of a transport network, wherein the trigger event comprises transport network type change event, wherein the type of the transport network is one of an optical fiber transport network or a satellite transport network, and wherein the transport network type change event is associated with a change in type of the transport network;
send transport network information to the policy control network element, wherein the transport network information is for formulating a control policy; and
receive the control policy from the policy control network element.

16. The communication apparatus according to claim 15, wherein the trigger event comprises one or more events in a policy control request (PCR) trigger form.

17. The communication apparatus according to claim 16, wherein the program further includes instructions to:
monitor a quality of service (QoS) of the transport network; and
determine the transport network information based on monitored QoS information.

18. The communication apparatus according to claim 16, wherein the program further includes instructions to:
monitor a quality of service (QoS) of the transport network;
send monitored QoS information to a network data analytics function network element; and
receive the transport network information from the network data analytics function network element.

19. A communication method, comprising:
sending, by a policy control network element, policy control information to a network device, wherein the policy control information indicates a trigger event for reporting transport network information, and wherein the trigger event triggers the network device to report the transport network information to the policy control network element, wherein the trigger event comprises transport network type change event;
receiving, by the network device, the policy control information;
sending, by the network device, the transport network information to the policy control network element, wherein the transport network information indicates a type of a transport network, wherein the type of the transport network is one of an optical fiber transport network or a satellite transport network, and wherein the transport network type change event is associated with a change in type of the transport network;
receiving, by the policy control network element, the transport network information from the network device;
formulating, by the policy control network element, a control policy based on the transport network information; and
sending, by the policy control network element, the control policy to the network device.

20. The method according to claim 19, wherein a type of the satellite transport network is one of a low earth orbit (LEO) satellite transport network, a medium earth orbit (MEO) satellite transport network, a high earth orbit (HEO) satellite transport network, a geostationary earth orbit (GEO) satellite transport network.

21. The method according to claim 19, wherein the network device is a session management function network element, and the control policy comprises a session management policy; and wherein the session management policy comprises adjusting a transmission delay parameter to a value greater than or equal to a transport network delay.

22. The method according to claim 19, further comprising:
receiving, by the network device, the policy control information from the policy control network element;
sending, by the network device, the transport network information to the policy control network element; and
receiving, by the policy control network element, the transport network information.

23. A communication system, comprising:
a policy control network element, configured to:
send policy control information to a network device, wherein the policy control information indicates a trigger event for reporting transport network information, and wherein the trigger event triggers the network device to report the transport network information to the policy control network element, wherein the trigger event comprises transport network type change event;
the network device, configured to:
receive the policy control information;
send the transport network information to the policy control network element, wherein the transport network information indicates a type of a transport network, wherein the type of the transport network is one of an optical fiber transport network or a satellite transport network, and wherein the transport network type change event is associated with a change in type of the transport network;
the policy control network element, further configured to:
receive the transport network information from the network device;
formulate a control policy based on the transport network information; and
send the control policy to the network device.

24. The communication system according to claim 23, wherein a type of the satellite transport network is one of a low earth orbit (LEO) satellite transport network, a medium earth orbit (MEO) satellite transport network, a high earth orbit (HEO) satellite transport network, a geostationary earth orbit (GEO) satellite transport network.

25. The communication system according to claim 23, wherein the network device is a session management function network element, and the control policy comprises a session management policy; and
wherein the session management policy comprises adjusting a transmission delay parameter to a value greater than or equal to a transport network delay.

26. The communication system according to claim 23, wherein the network device is further configured to:
receive the policy control information from the policy control network element; and
send the transport network information to the policy control network element.

27. The communication method according to claim 1, wherein the network device is an access and mobility management network element, and wherein the control policy comprises at least one of a terminal policy or an access and mobility management policy.

28. The communication method according to claim 27, wherein the terminal policy comprises at least one of allowing a terminal to initiate a session to a specified data network or a single network slice selection assistance information network element, or forbidding a terminal to transmit data in a radio access manner.

29. The communication method according to claim 27, wherein the access and mobility management policy comprises forbidding a terminal in a restricted area to actively initiate a service.

30. The communication method according to claim 27, wherein the network device is an access and mobility management network element, and the control policy comprises at least one of a terminal policy or an access and mobility management policy.

31. The communication apparatus to claim 9, wherein the network device is an access and mobility management network element, and the control policy comprises at least one of a terminal policy or an access and mobility management policy.

32. The communication apparatus to claim 15, wherein the communication apparatus is an access and mobility management network element, and wherein the control policy comprises at least one of a terminal policy or an access and mobility management policy.

* * * * *

UNITED STATES PATENT AND TRADEMARK OFFICE
CERTIFICATE OF CORRECTION

PATENT NO. : 11,677,646 B2  
APPLICATION NO. : 17/404232  
DATED : June 13, 2023  
INVENTOR(S) : Sun et al.

Page 1 of 1

It is certified that error appears in the above-identified patent and that said Letters Patent is hereby corrected as shown below:

In the Claims

In Column 37, in Claim 9, Line 12, after "non-transitory" delete "computer".

In Column 37, in Claim 15, Line 58, after "non-transitory" delete "computer".

In Column 40, in Claim 30, Line 28, delete "claim 27," and insert -- claim 6, --, therefor.

In Column 40, in Claim 31, Line 33, delete "apparatus to" and insert -- apparatus according to --, therefor.

In Column 40, in Claim 32, Line 38, delete "apparatus to" and insert -- apparatus according to --, therefor.

Signed and Sealed this  
Twenty-ninth Day of August, 2023

Katherine Kelly Vidal  
*Director of the United States Patent and Trademark Office*